United States Patent
Landis et al.

(10) Patent No.: US 12,512,928 B2
(45) Date of Patent: Dec. 30, 2025

(54) PRODUCT CODE FOR WIRELESS COMMUNICATIONS

(71) Applicant: QUALCOMM Incorporated, San Diego, CA (US)

(72) Inventors: Shay Landis, Hod Hasharon (IL); Peer Berger, Hod Hasharon (IL); Jacob Pick, Beit Zayit, IL (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 18/156,780

(22) Filed: Jan. 19, 2023

(65) Prior Publication Data
US 2024/0250776 A1    Jul. 25, 2024

(51) Int. Cl.
*H04L 1/00* (2006.01)
*H04W 72/232* (2023.01)

(52) U.S. Cl.
CPC .......... *H04L 1/0057* (2013.01); *H04L 1/0003* (2013.01); *H04L 1/005* (2013.01); *H04W 72/232* (2023.01)

(58) Field of Classification Search
CPC ..... H04L 1/0057; H04L 1/0003; H04L 1/005; H04L 1/0009; H04L 1/0025; H04L 1/0075; H04W 72/232
See application file for complete search history.

(56) References Cited

U.S. PATENT DOCUMENTS

2015/0381209 A1* 12/2015 Roh ............... H04L 1/0064 714/755
2023/0069705 A1* 3/2023 Koganei ......... H04L 25/067

* cited by examiner

*Primary Examiner* — Jianye Wu
(74) *Attorney, Agent, or Firm* — Kevin M. Donnelly; Harrity & Harrity, LLP

(57) ABSTRACT

Various aspects of the present disclosure generally relate to wireless communication and to product codes for wireless communications. Some aspects more specifically relate to enabling a Bose-Chaudhuri-Hocquenghem (BCH) product code for wireless communications. In some aspects, a transmitter and/or a receiver may flexibly select parameters for a BCH product code based on or otherwise associated with communication parameters of a wireless communication to be encoded, such as the modulation and coding scheme (MCS) and/or allocation size, among other examples. For example, the transmitter and/or the receiver may select parameters for the BCH product code to ensure that the BCH product code is designed to handle a quantity of channel bits associated with a current configuration of a channel (for example, of an uplink data channel and/or a downlink data channel) and to increase a correction capability associated with the BCH product code for the current configuration of the channel.

30 Claims, 10 Drawing Sheets

PRODUCT CODE FOR WIRELESS COMMUNICATIONS

FIELD OF THE DISCLOSURE

Aspects of the present disclosure generally relate to wireless communication and specifically, to techniques and apparatuses associated with a product code for wireless communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Error correction coding techniques may be used by a wireless communication device for encoding a communication as a set of binary numbers in such a way that the communication can be recovered by another device that receives the communication even if some bits of the communication are associated with an error (for example, if a value of a bit as received by a receiver is incorrect). Although error correction coding techniques, such as low density parity check (LDPC) coding, may beneficially protect data and result in reduced communication error rates, such processes may be associated with large overhead due to the addition of error correction bits to the raw data stream, and/or require relatively high power consumption at a transmitter and a receiver to encode and decode the data, respectively. For example, in some instances, decoding a channel with an LDPC decoder at the receiver may constitute the greatest power-consuming operation in a digital chain (for example, in some cases representing greater than 60% of the power consumption used by a modem associated with the receiver). Error correction coding techniques, such as LDPC coding, may consume even more power when implemented for high-frequency communications, such as communications in the millimeter wave bands and/or communications in sub-terahertz bands. Such high-frequency communications may be associated with relatively large bandwidths and high data rates or bit rates, leading to high power consumption associated with LDPC decoding processes. Therefore, the transmitter and the receiver may either forgo LDPC coding or similar error correction coding techniques to reduce power consumption, leading to increased transmission error rates and thus more unreliable communications, or may employ LDPC coding or a similar error correction coding scheme at a cost of high power consumption and large hardware overhead. For example, components associated with performing LDPC coding may be associated with a large physical size, thereby consuming a large portion of an available space of a die (for example, an integrated circuit) of a modem associated with the transmitter and/or the receiver.

In some cases, the transmitter and the receiver may use an algebraic error correcting code, such as a product code, to respectively encode and decode data communicated via a wireless network. An algebraic error correcting code is a code that is associated with encoding and/or decoding data using an algebraic method, such as using syndrome decoding, among other examples. For example, a cyclic error correcting code, such as a Bose-Chaudhuri-Hocquenghem (BCH) product code, may be used to encode and decode data communicated via the wireless network. The algebraic error correcting code may be associated with a lower power overhead and/or a smaller physical size of components associated with performing encoding and decoding (for example, compared to LDPC coding or other error correcting coding techniques). However, algebraic error correcting codes may be associated with worse performance than LDPC coding or other error correcting coding techniques. For example, algebraic error correcting codes, such as the BCH product code, may result in increased transmission error rates as compared to LDPC coding.

SUMMARY

Some aspects described herein relate to a transmitter for wireless communication. The transmitter may include at least one memory and at least one processor communicatively coupled with the at least one memory. The at least one processor may be operable to cause the transmitter to transmit or receive, to or from a receiver, an indication of one or more communication parameters associated with a communication, the one or more communication parameters including at least one of an allocation size or a modulation and coding scheme (MCS). The at least one processor may be operable to cause the transmitter to transmit, to the receiver and using the one or more communication parameters, an encoded communication obtained by encoding the communication using a Bose-Chaudhuri-Hocquenghem (BCH) product code, the BCH product code being associated with one or more code parameters that are associated with the one or more communication parameters.

Some aspects described herein relate to a receiver for wireless communication. The receiver may include at least one memory and at least one processor communicatively coupled with the at least one memory. The at least one processor may be operable to cause the receiver to transmit or receive, to or from a transmitter, an indication of one or more communication parameters associated with a communication, the one or more communication parameters including at least one of an allocation size or an MCS. The at least one processor may be operable to cause the receiver to receive, from the transmitter and using the one or more communication parameters, an encoded communication, of the communication. The at least one processor may be operable to cause the receiver to decode the encoded communication using a BCH product code, the BCH product code being associated with one or more code parameters that are associated with the one or more communication parameters.

Some aspects described herein relate to a method of wireless communication performed by a transmitter. The method may include transmitting or receiving, to or from a receiver, an indication of one or more communication parameters associated with a communication, the one or more communication parameters including at least one of an allocation size or an MCS. The method may include transmitting, to the receiver and using the one or more communication parameters, an encoded communication obtained by encoding the communication using a BCH product code, the BCH product code being associated with one or more code parameters that are associated with the one or more communication parameters.

Some aspects described herein relate to a method of wireless communication performed by a receiver. The method may include transmitting or receiving, to or from a transmitter, an indication of one or more communication parameters associated with a communication, the one or more communication parameters including at least one of an allocation size or an MCS. The method may include receiving, from the transmitter and using the one or more communication parameters, an encoded communication, of the communication. The method may include decoding the encoded communication using a BCH product code, the BCH product code being associated with one or more code parameters that are associated with the one or more communication parameters.

Some aspects described herein relate to a non-transitory computer-readable medium that stores a set of instructions for wireless communication by a transmitter. The set of instructions, when executed by one or more processors of the transmitter, may cause the transmitter to transmit or receive, to or from a receiver, an indication of one or more communication parameters associated with a communication, the one or more communication parameters including at least one of an allocation size or an MCS. The set of instructions, when executed by one or more processors of the transmitter, may cause the transmitter to transmit, to the receiver and using the one or more communication parameters, an encoded communication obtained by encoding the communication using a BCH product code, the BCH product code being associated with one or more code parameters that are associated with the one or more communication parameters.

Some aspects described herein relate to a non-transitory computer-readable medium that stores a set of instructions for wireless communication by a receiver. The set of instructions, when executed by one or more processors of the receiver, may cause the receiver to transmit or receive, to or from a transmitter, an indication of one or more communication parameters associated with a communication, the one or more communication parameters including at least one of an allocation size or an MCS. The set of instructions, when executed by one or more processors of the receiver, may cause the receiver to receive, from the transmitter and using the one or more communication parameters, an encoded communication, of the communication. The set of instructions, when executed by one or more processors of the receiver, may cause the receiver to decode the encoded communication using a BCH product code, the BCH product code being associated with one or more code parameters that are associated with the one or more communication parameters.

Some aspects described herein relate to an apparatus for wireless communication. The apparatus may include means for transmitting or means for receiving, to or from a receiver, an indication of one or more communication parameters associated with a communication, the one or more communication parameters including at least one of an allocation size or an MCS. The apparatus may include means for transmitting, to the receiver and using the one or more communication parameters, an encoded communication obtained by encoding the communication using a BCH product code, the BCH product code being associated with one or more code parameters that are associated with the one or more communication parameters.

Some aspects described herein relate to an apparatus for wireless communication. The apparatus may include means for transmitting or means for receiving, to or from, with a transmitter, an indication of one or more communication parameters associated with a communication, the one or more communication parameters including at least one of an allocation size or an MCS. The apparatus may include means for receiving, from the transmitter and using the one or more communication parameters, an encoded communication, of the communication. The apparatus may include means for decoding the encoded communication using a BCH product code, the BCH product code being associated with one or more code parameters that are associated with the one or more communication parameters.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
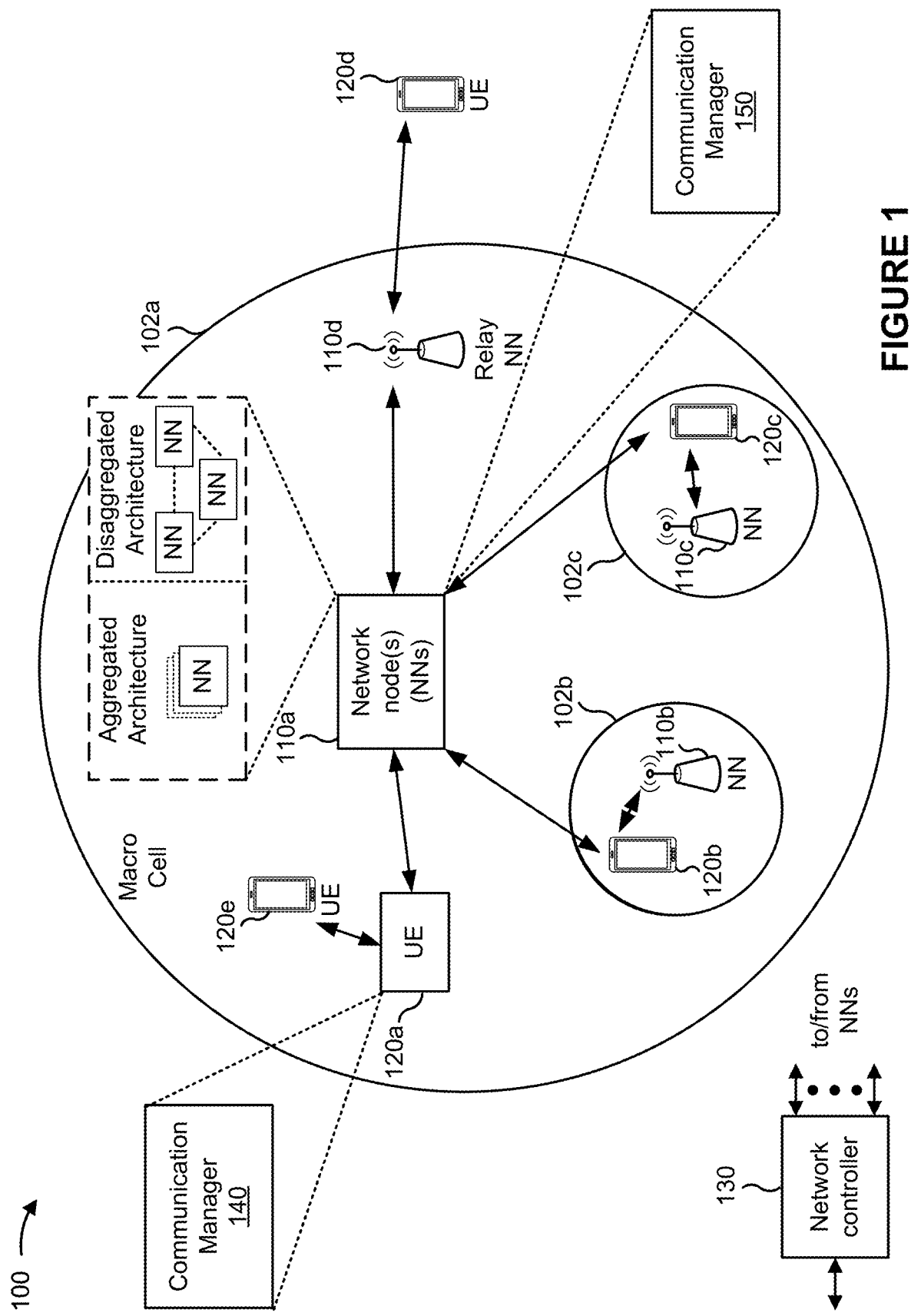
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to product codes for wireless communications. Some aspects more specifically relate to enabling the use of a Bose-Chaudhuri-Hocquenghem (BCH) product code for encoding and decoding wireless communications. In some aspects, a transmitter and/or a receiver may flexibly select parameters for a BCH product code based on or otherwise associated with communication parameters of a wireless communication to be encoded, such as the modulation and coding scheme (MCS) and/or allocation size, among other examples. For example, the BCH product code may be designed to control a quantity of errors that are correctable by a decoder (for example, a receiver). Therefore, the transmitter and/or the receiver may select parameters for the BCH product code to ensure that the BCH product code is designed to handle a quantity of channel bits associated with a current configuration of a channel (for example, of an uplink data channel and/or a downlink data channel) and to increase a correction capability (for example, a quantity of errors that are correctable) associated with the BCH product code for the current configuration of the channel.

Particular aspects of the subject matter described in this disclosure can be implemented to realize one or more of the following potential advantages. In some examples, the described techniques can be used to flexibly design a BCH product code for wireless communications using one or more communication parameters associated with a communication (for example, a data communication). This improves a performance of the BCH product code (for example, increases a correction capability and/or a quantity of errors that are correctable associated with the BCH product) for the communication. Enabling a transmitter and a receiver to use the BCH product code with improved performance conserves power of the transmitter and the receiver that would have otherwise been used performing encoding and decoding using a higher power consuming code, such as a low density parity check (LDPC) code. For example, the BCH product code may be associated with smaller codewords or code blocks than other error correcting codes, such as LDPC codes. As a result, power consumption associated with performing the coding may be reduced and a size and/or quantity of hardware components associated with performing the coding may be reduced. For example, components (for example, included in a die of a modem associated with the transmitter and/or receiver) associated with performing BCH coding may be associated with a smaller physical size than components associated with performing other coding, such as LDPC coding.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as ULE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a transmitter may include a communication manager 140 (for example, if the UE 120 is the transmitter) or a communication manager 150 (for example, if the network node 110 is the transmitter). As described in more detail elsewhere herein, the communication manager 140 and/or the communication manager 150 may transmit or receive, to or from a receiver, an indication of one or more communication parameters associated with a communication, the one or more communication parameters including at least one of an allocation size or a modulation and coding scheme (MCS); and transmit, to the receiver and using the one or more communication parameters, an encoded communication obtained by encoding the communication using a Bose-Chaudhuri-Hocquenghem (BCH) product code, the BCH product code being associated with one or more code parameters that are associated with the one or more communication parameters. Additionally or alternatively, the communication manager 140 and/or the communication manager 150 may perform one or more other operations described herein.

In some aspects, the receiver may include the communication manager 140 (for example, if the UE 120 is the receiver) or the communication manager 150 (for example, if the network node 110 is the receiver). As described in more detail elsewhere herein, the communication manager 140 and/or the communication manager 150 may transmit or receive, to or from a transmitter, an indication of one or more communication parameters associated with a communication, the one or more communication parameters including at least one of an allocation size or a MCS; receive, from the transmitter and using the one or more communication parameters, an encoded communication, of the communication; and decode the encoded communication using a BCH product code, the BCH product code being associated with one or more code parameters that are associated with the one or more communication parameters. Additionally or alternatively, the communication manager 140 and/or the communication manager 150 may perform one or more other operations described herein.

Figure 2:
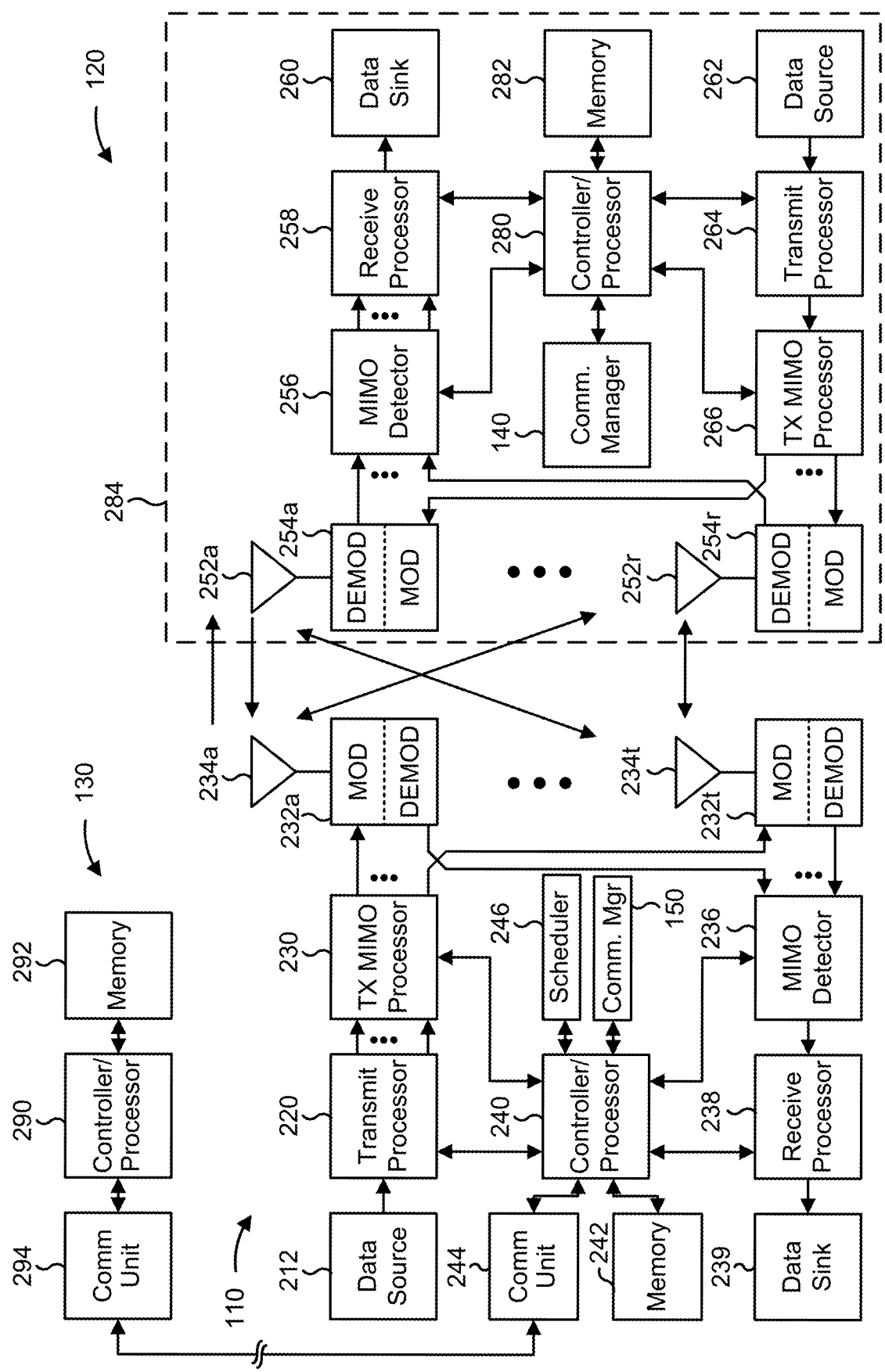
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with a product code for wireless communications, as described in more detail elsewhere herein. In some aspects, the transmitter described herein is the network node 110, is included in the network node 110, or includes one or more components of the network node 110 shown in FIG. 2. In other aspects, the transmitter described herein is the UE 120, is included in the UE 120, or includes one or more components of the UE 120 shown in FIG. 2. In some aspects, the receiver described herein is the network node 110, is included in the network node 110, or includes one or more components of the network node 110 shown in FIG. 2. In other aspects, the receiver described herein is the UE 120, is included in the UE 120, or includes one or more components of the UE 120 shown in FIG. 2.

Figure 6:
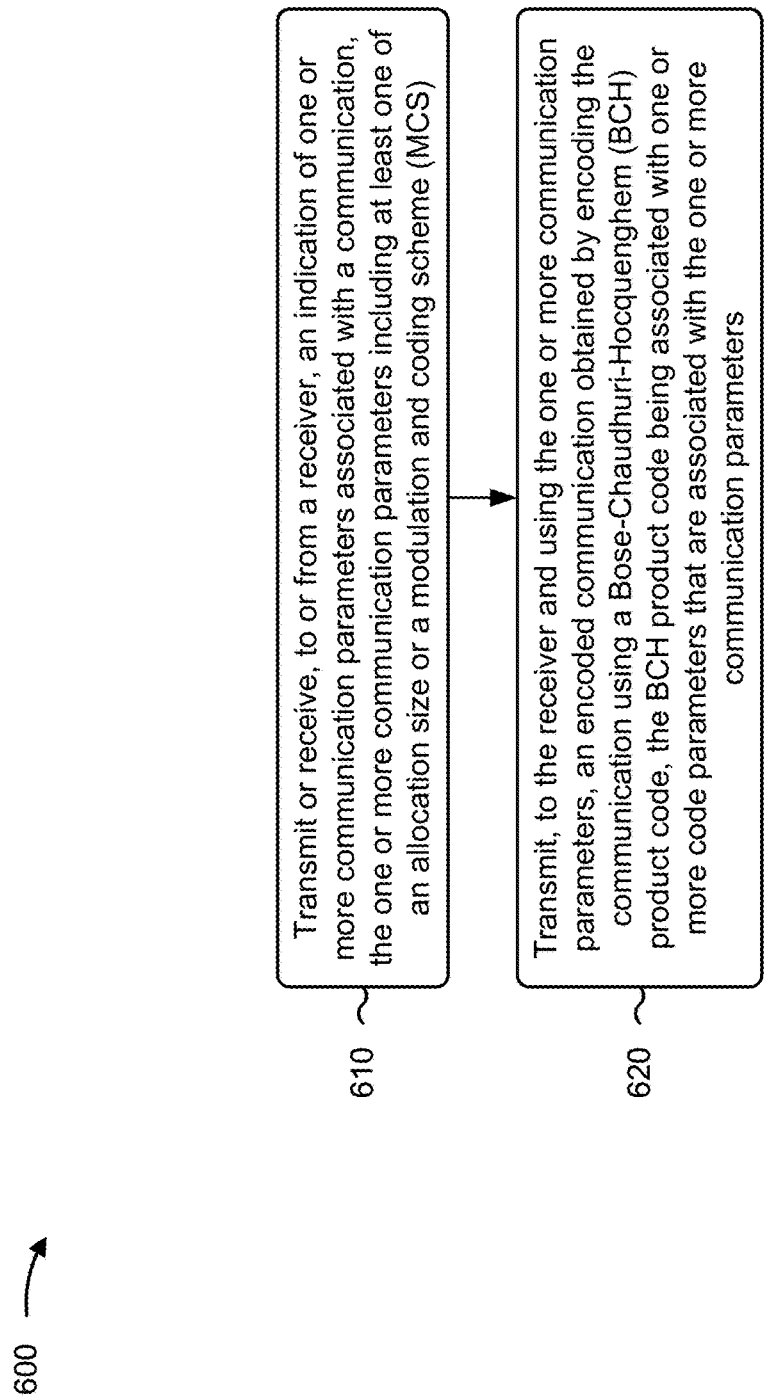
FIG. 6 is a flowchart illustrating an example process performed, for example, by a transmitter that supports a product code for wireless communications in accordance with the present disclosure.
Figure 7:
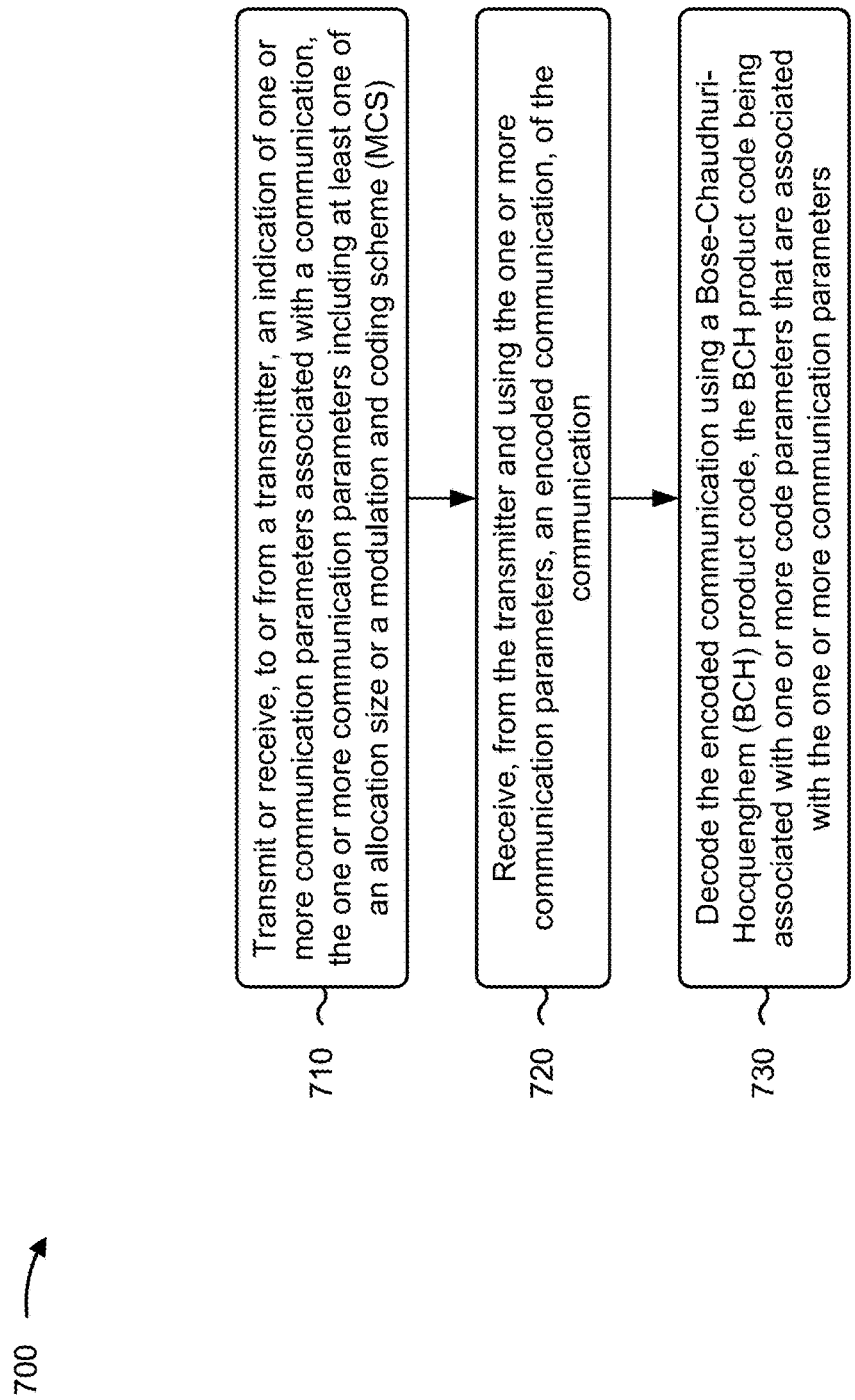
FIG. 7 is a flowchart illustrating an example process performed, for example, by a receiver that supports a product code for wireless communications in accordance with the present disclosure.

For example, the controller/processor 240 of the network node 110, the controller/processor 280 of the UE 120, or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, and/or other processes as described herein. In some examples, executing instructions may include running the instructions, converting the instructions, compiling the instructions, or interpreting the instructions, among other examples.

In some aspects, the transmitter includes means for transmitting or means for receiving, to or from a receiver, an indication of one or more communication parameters associated with a communication, the one or more communication parameters including at least one of an allocation size or an MCS; and/or means for transmitting, to the receiver and using the one or more communication parameters, an encoded communication obtained by encoding the communication using a BCH product code, the BCH product code being associated with one or more code parameters that are associated with the one or more communication parameters. In some aspects, the means for the transmitter to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In other aspects, the means for the transmitter to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the receiver includes means for transmitting or means for receiving, to or from a transmitter, an indication of one or more communication parameters associated with a communication, the one or more communication parameters including at least one of an allocation size or an MCS; and/or means for receiving, from the transmitter and using the one or more communication parameters, an encoded communication, of the communication; and/or means for decoding the encoded communication using a BCH product code, the BCH product code being associated with one or more code parameters that are associated with the one or more communication parameters. In some aspects, the means for the receiver to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In other aspects, the means for the receiver to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
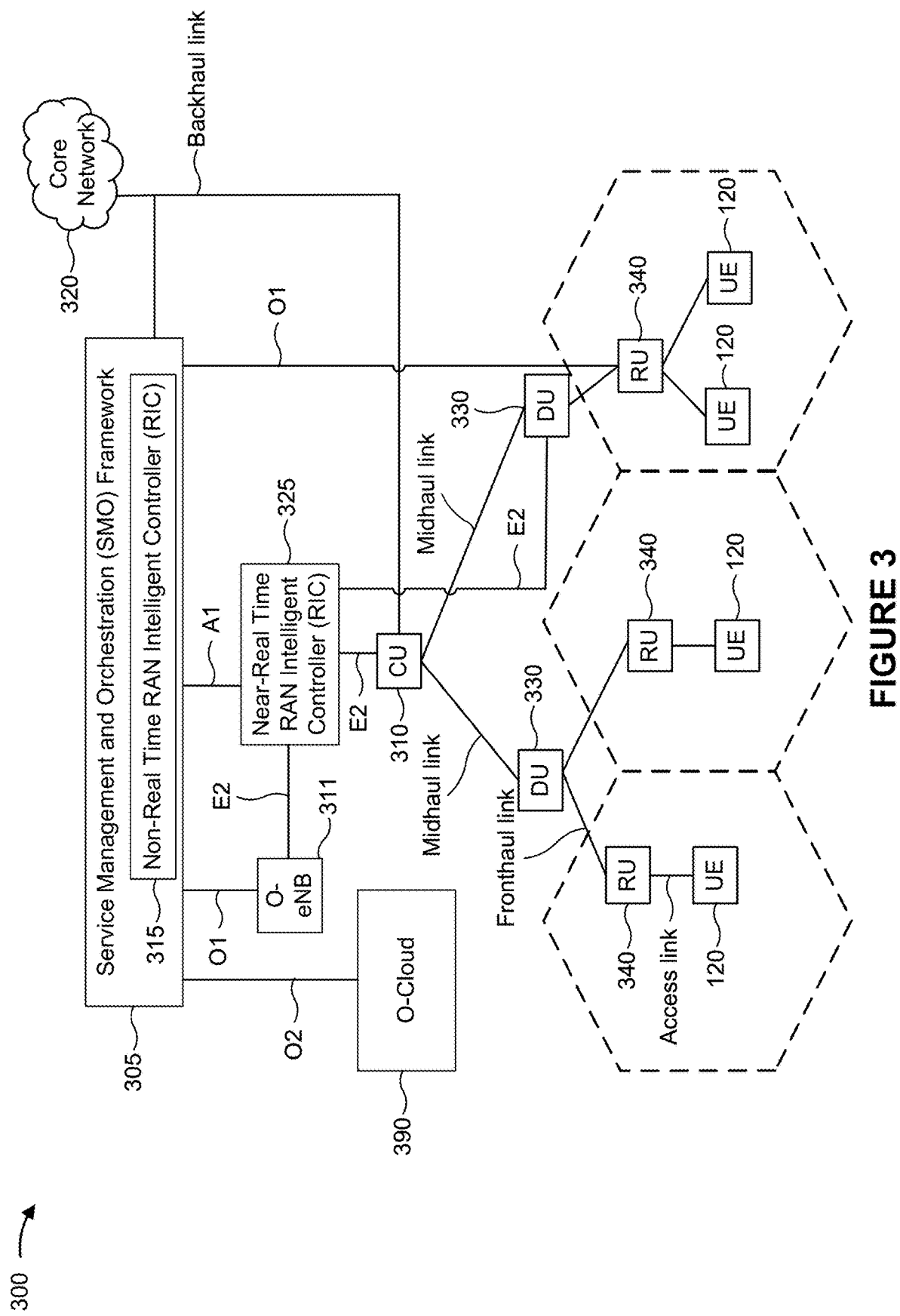
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on or otherwise associated with a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
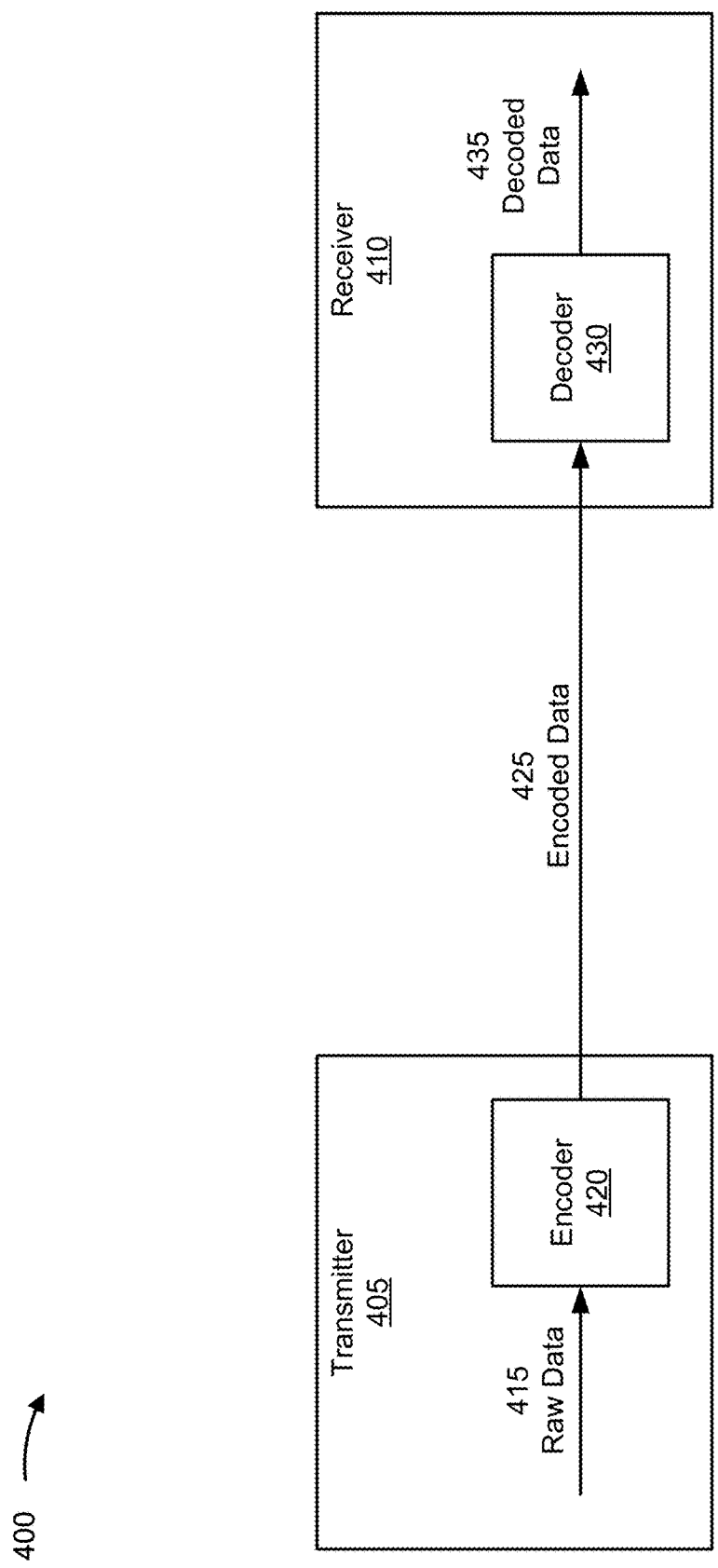
FIG. 4 is a diagram illustrating an example of wireless communication including network coding in accordance with the present disclosure.

FIG. 4 is a diagram illustrating an example of wireless communication including network coding 400 in accordance with the present disclosure. As shown in FIG. 4, a transmitter 405 may be in wireless communication with a receiver 410. In some cases, the transmitter 405 may include one of a UE 120 or a network node 110, and the receiver 410 may include the other one of the UE 120 and the network node 110. The transmitter 405 and the receiver 410 may be in wireless communication via a wireless network, such as the wireless network 100 described in connection with FIG. 1. When the transmitter 405 transmits data to the receiver 410, the transmitter 405 may first encode the data using an error correcting code, such as an LDPC code, among other examples. More particularly, the transmitter 405 may process raw data 415 to be transmitted to the receiver 410 by feeding the raw data 415 through an encoder 420, among other signal processing components. The transmitter 405 may perform other signal processing operations (for example, interleaving), which are not shown in FIG. 4 for ease of the description.

The encoder 420 may add error correction bits to the raw data 415 based on or otherwise associated with a selected base graph and/or based on or otherwise associated with a target code rate, forming a stream of encoded data 425. "Code rate" may refer to a quantity of raw data bits divided by a total quantity of bits in an encoded data stream (for example, the code rate is the proportion of the data stream that is useful, or non-redundant), and thus LDPC coding or similar processes associated with a lower code rate provide more error protection, but require additional overhead, than LDPC coding or similar processes associated with a higher code rate. The encoded data 425 may be transmitted by the transmitter 405 to the receiver 410 using a RAN, where the encoded data 425 is fed through a decoder 430 (and, in some aspects, other signal processing components such as a de-interleaver) in order to extract decoded data 435 therefrom.

Although error correction coding processes, such as LDPC coding, may beneficially protect data streams and result in reduced communication error rates, such processes may be associated with large overhead due to the addition of error correction bits to the raw data stream, and/or require relatively high power consumption at the transmitter and the receiver to encode and decode the raw data. For example, in some instances, decoding a channel with an LDPC decoder at the receiver may constitute the greatest power-consuming operation in the digital chain, in some cases representing greater than 60% of the power consumption used by a modem associated with a UE. Error correction coding processes, such as LDPC coding, may consume even more power when implemented for high-frequency communications, such as communications in the millimeter wave (for example, FR2) bands and/or communications in sub-terahertz bands, such as FR4 and beyond. Such high-frequency communications may be associated with relatively large bandwidths and high data/bit rates, leading to high power consumption associated with LDPC decoding processes. For example, for certain sub-terahertz communications, LDPC power consumption may approach 90% of the overall power consumption by the modem associated with the UE. Thus, a network node and a UE may either forgo LDPC coding and similar error correction coding in order to reduce power consumption, leading to increased transmission error rates and thus unreliable communications, or else employ LDPC coding or a similar error correction coding scheme at a cost of high power consumption and large overhead. Further, components associated with performing LDPC coding may be associated with a large physical size, thereby consuming a large portion of an available space of a die (for example, an integrated circuit) of a modem associated with the UE.

In some cases, a transmitter and receiver may use an algebraic error correcting code, such as a product code, to encode and decode data communicated via a wireless network. An algebraic error correcting code may be a code that is encoded and/or decoded using an algebraic method, such as syndrome decoding, among other examples. For example, a cyclic error correcting code, such as a BCH product code, may be used to encode and decode data communicated via the wireless network. The algebraic error correcting code may be associated with a lower power overhead and/or a smaller physical size of components associated with performing encoding and decoding (for example, compared to LDPC coding or other error correcting codes). However, algebraic error correcting codes may be associated with worse performance than LDPC coding or other error correcting codes. For example, algebraic error correcting codes, such as the BCH product code, may result in increased transmission error rates as compared to LDPC coding.

Various aspects relate generally to product codes for wireless communications. Some aspects more specifically relate to enabling a BCH product code for wireless communications. In some aspects, a transmitter and/or a receiver may flexibly select parameters for a BCH product code based on or otherwise associated with parameters of a wireless communication (for example, of a data communication), such as the MCS and/or allocation size, among other examples. For example, the BCH product code may be designed to control a quantity of errors that are correctable by a decoder (for example, a receiver). Therefore, the transmitter and/or the receiver may select parameters for the BCH product code to ensure that the BCH product code is designed to handle a quantity of channel bits associated with a current configuration of a channel (for example, of an uplink data channel and/or a downlink data channel) and to increase a correction capability (for example, a quantity of errors that are correctable) associated with the BCH product code for the current configuration of the channel. In some aspects, the transmitter and/or the receiver may select parameters for the BCH product code using communication parameters (for example, an MCS and/or an allocation size) of a wireless communication that is to be encoded and decoded using the BCH product code.

Particular aspects of the subject matter described in this disclosure can be implemented to realize one or more of the following potential advantages. In some examples, the described techniques can be used to flexibly design a BCH product code for wireless communications using one or more communication parameters associated with a communication (for example, a data communication). This improves a performance of the BCH product code (for example, increases a correction capability and/or a quantity of errors that are correctable associated with the BCH product) for the communication. Enabling a transmitter and a receiver to use the BCH product code with improved performance conserves power of the transmitter and the receiver that would have otherwise been used performing encoding and decoding using a higher power consuming code, such as LDPC coding. Additionally, components associated with performing BCH coding may be associated with a smaller physical size than components associated with performing other network coding, such as LDPC coding. Therefore, a physical size of components (for example, included in a die of a modem associated with the transmitter and/or receiver) associated with performing encoding and decoding is reduced.

Figure 5A:
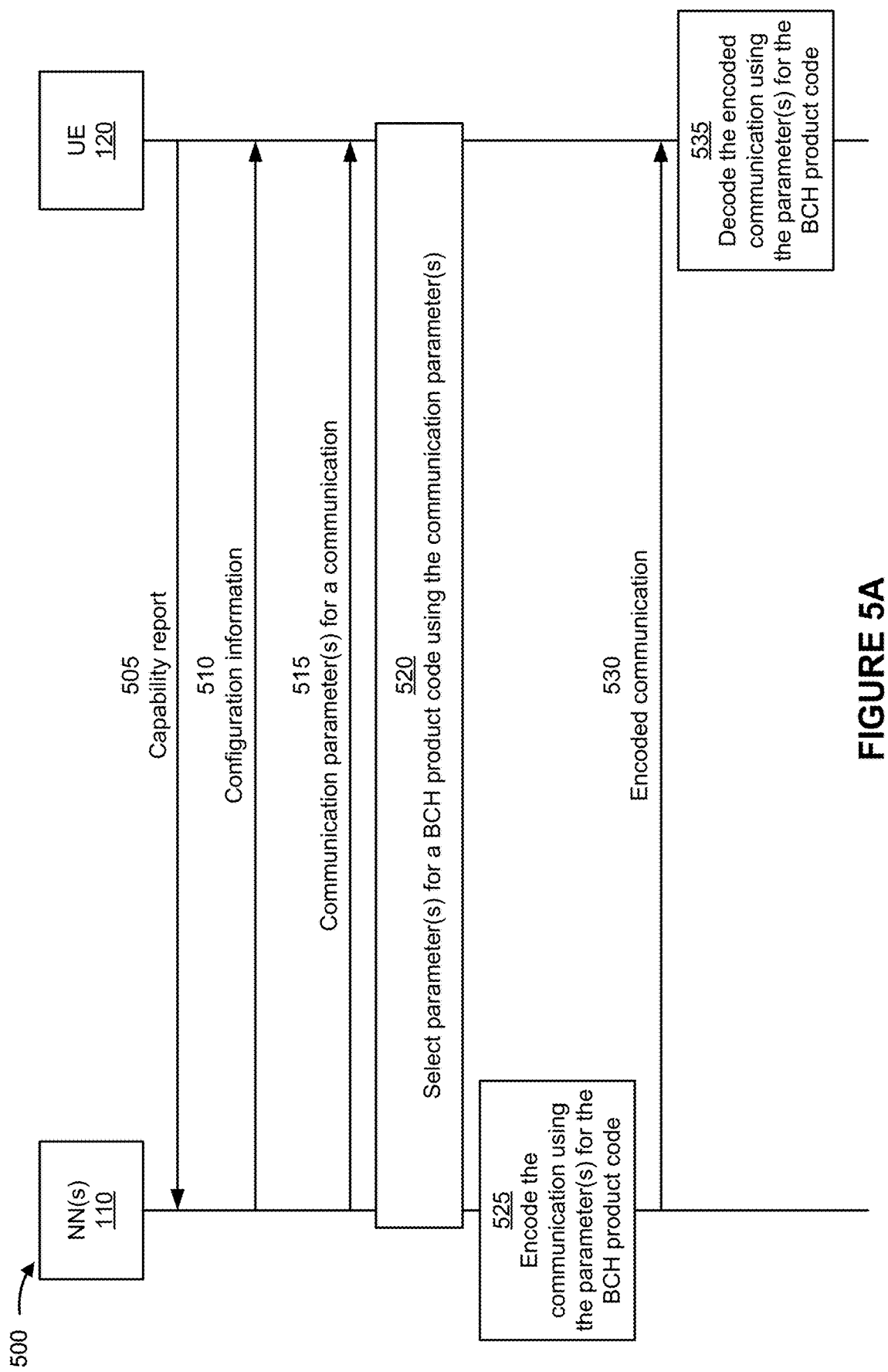
FIGS. 5A and 5B are diagrams of an example associated with a product code for wireless communications in accordance with the present disclosure.
Figure 5B:
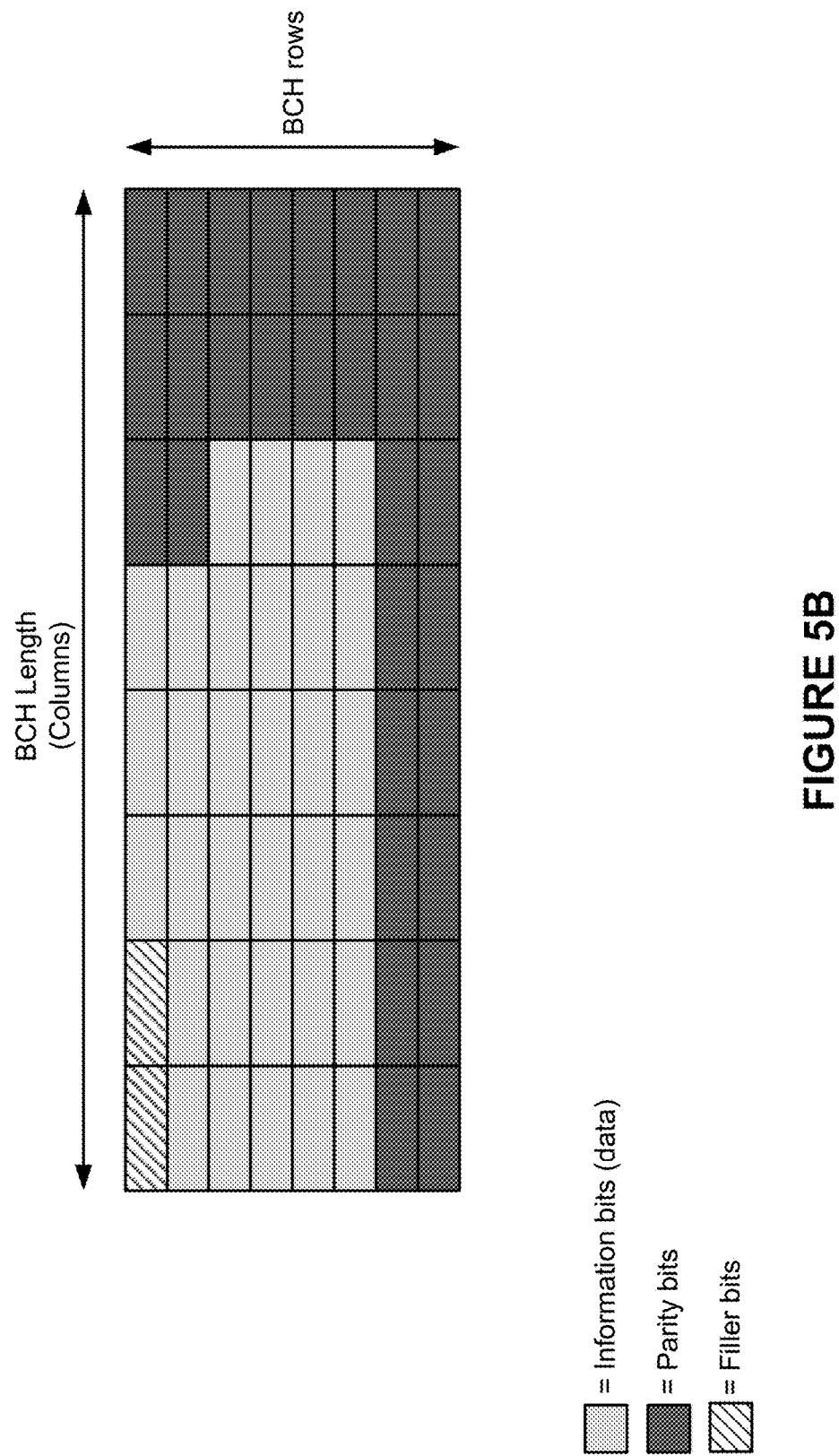

FIGS. 5A and 5B are diagrams of an example associated with a product code 500 for wireless communications in accordance with the present disclosure. As shown in FIG. 5A, one or more network nodes (NNs) 110 (for example, a base station, a CU, a DU, and/or an RU) may communicate with a UE 120. In some aspects, the network node(s) 110 and the UE 120 may be part of a wireless network (for example, wireless network 100). The UE 120 and the network node 110 may have established a wireless connection prior to operations shown in FIG. 5A.

In some aspects, the UE 120 and/or the network node 110 may be referred to herein as a "receiver" or a "transmitter." As used herein, "receiver" may refer to a device (for example, the UE 120 or the network node 110) that is receiving an encoded communication that is encoded using the product code (for example, the BCH product code), as described herein. Similarly, "transmitter" may refer to a device (for example, the UE 120 or the network node 110) that is transmitting an encoded communication that is encoded using the product code (for example, the BCH product code), as described herein. For example, in some cases, a receiver described herein may be capable of transmitting an encoded communication that is encoded using the product code (for example, the BCH product code) in a similar manner as described in connection with the transmitter. Additionally, a transmitter described herein may be capable of receiving an encoded communication that is encoded using the product code (for example, the BCH product code) in a similar manner as described in connection with the receiver. FIG. 5A depicts the network node 110 as the transmitter and the UE 120 as the receiver for ease of description (for example, where the encoded communication is a downlink communication). In other aspects, the UE 120 may be the transmitter and the network node 110 may be the receiver (for example, where the encoded communication is an uplink communication).

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU). As used herein, the network node 110 "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU, and the RU transmitting the communication to the UE 120. Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU.

In a first operation 505, the UE 120 may transmit, and the network node 110 may receive, a capability report. The capability report may indicate that the UE 120 supports performing one or more operations described herein. For example, the capability report may indicate that the UE 120 supports a product code, such as the BCH product code described herein. In some aspects, the capability report may indicate that the UE 120 supports dynamically adjusting or selecting parameters of the BCH product code based on or otherwise associated with one or more communication parameters of a communication associated with the BCH product code (for example, a communication to be encoded and decoded using the BCH product code). The capability report may be communicated via an uplink control channel (for example, a physical uplink control channel (PUCCH)), a UE assistance information (UAI) communication, and/or an RRC communication, among other examples.

A product code may be an error correction code in data is encoded separately for rows and columns of a grid (also referred to as a matrix). For example, the data (such as bits) may be organized in the grid. Rows of the grid may be encoded to generate a first set of codewords (or code blocks). Similarly, columns of the grid may be encoded to generate a second set of codewords (or code blocks). The use of product codes, as described herein, mitigates the problems of traditional error correcting codes (ECCs) (such as LDPC codes) by exploiting the subdivision of one large product code into small component codes of limited correction capability. These small codes, which may be short BCH codes, are organized into a cross-checking grid structure within a higher-level product code, which enables the use of multiple-iteration, turbo-style decoding to provide error correction capability close to that of a conventional decoder in an ECC (for example, close to that of LDPC codes), but with a much lower implementation cost due to the reduction of the hardware components that process the individual component codes. This makes the use of product codes (for example, the BCH product code) beneficial for devices that have restrictive area and power budgets, but which still need to handle high raw bit-error-rates and meet high bandwidth and latency targets. A BCH code may be a cyclic error correcting code that is constructed using polynomials over a finite field (for example, a grid or matrix as described in more detail elsewhere herein).

In a second operation 510, the network node 110 may transmit, and the ULE 120 may receive, configuration information. In some aspects, the UE 120 may receive the configuration information via one or more of system information signaling, RRC signaling, one or more MAC control elements (MAC-CEs), and/or downlink control information (DCI), among other examples. In some aspects, the configuration information may include an indication of one or more configuration parameters (for example, stored by the UE 120 and/or previously indicated by the network node 110 or other network device) for selection by the UE 120, and/or explicit configuration information for the UE 120 to use to configure itself, among other examples.

In some aspects, the configuration information may indicate that the UE 120 is to use a product code for communications between the UE 120 and the network node 110. For example, the configuration information may indicate that the UE 120 is to use a BCH product code for communications between the UE 120 and the network node 110. For example, the configuration information may indicate that transport block (TB) level coding is to be performed for communications between the UE 120 and the network node 110. In other words, a TB of a communication may be directly encoded and decoded using the BCH product code described herein.

In some aspects, the configuration information may indicate that parameters of the BCH product code are to be based on or otherwise associated with communication parameters associated with the UE 120 and the network node 110. For example, the communication parameters may include an MCS, an allocation size (for example, a time domain allocation size and/or a frequency domain allocation size), a code rate, a bandwidth, a rank, a quantity of channel bits available, and/or one or more channel parameters (for example, one or more physical downlink shared channel (PDSCH) parameters and/or one or more physical uplink shared channel (PUSCH) parameters), among other examples. In this way, the BCH product code may be flexible to accommodate different MCSs and/or different allocation sizes, among other examples. For example, the configuration information may indicate that a quantity of rows and a quantity of columns of a grid associated with the BCH product code (for example, such as the grid depicted in FIG. 5B) are to be based on or otherwise associated with the one or more communication parameters.

In some aspects, the one or more communication parameters may be indicated via the configuration information. For example, the configuration information may include a PDSCH configuration and/or a PUSCH configuration. One or more communications parameters may be indicated via the PDSCH configuration and/or the PUSCH configuration. Additionally or alternatively, one or more communication parameters may be indicated via scheduling information for a communication (for example, via DCI scheduling the communication or another communication indicating the scheduling information, such as an RRC communication or a MAC-CE communication).

In some aspects, the configuration information may indicate a first code associated with rows of the grid associated with the BCH product code and a second code associated with columns of the grid. For example, for a product code, the first code may be used to encode respective rows of the grid and the second code may be used to encode respective columns of the grid. Each row and each column may be codewords of the BCH product code. In some aspects, the first code and the second code may be the same code. In other aspects, the first code and the second code may be different codes.

In some aspects, the configuration information may indicate decoding information associated with the BCH product code. For example, the configuration information may indicate one or more decoding operations to be performed to decode communications that are encoded using the BCH product code. In some aspects, the one or more decoding operations may include one or more hard-decision (HD) decoding operations and/or one or more soft-decision (SD) decoding operations.

The UE 120 may configure itself based at least in part on the configuration information. In some aspects, the UE 120 may be configured to perform one or more operations described herein based at least in part on the configuration information.

In a third operation 515, the network node 110 may transmit, and the UE 120 may receive, an indication of one or more communication parameters associated with a communication. For example, the network node 110 and the UE 120 may communicate (for example, transmit or receive) the indication of the one or more communication parameters. In some aspects, the indication of the one or more communication parameters may be included in the configuration information. In such examples, the third operation 515 and the second operation 510 may be a single operation (for example, the third operation 515 may be performed as part of the second operation 510).

Additionally or alternatively, the indication of the one or more communication parameters may be included in a separate communication. For example, the indication of the one or more communication parameters may be included in a scheduling communication that schedules the communication. For example, the scheduling communication may be included in a DCI communication, a MAC-CE communication, and/or an RRC communication. Additionally or alternatively, one or more of the communication parameters may be defined, or otherwise fixed, by a wireless communication standard, such as the 3GPP. In such examples, the one or more communication parameters may not be communicated between the UE 120 and the network node 110. For example, the indication of the one or more communication parameters may be communicated in downlink control information that schedules the communication. Additionally or alternatively, the indication of the one or more communication parameters may be communicated in a radio resource control communication or a MAC-CE communication.

In some aspects, the one or more communication parameters may include an allocation size and/or an MCS, among other examples. The allocation size may be a frequency domain allocation size (for example, a quantity of resource blocks) and/or a time domain allocation size (for example, a quantity of symbols or slots). Additionally or alternatively, the one or more communication parameters may include a code rate, a bandwidth, a rank, a transport block size, a quantity of channel bits available, and/or one or more channel parameters (for example, one or more PDSCH parameters and/or one or more PUSCH parameters), among other examples. In some aspects, the network node 110 and/or the UE 120 may determine at least one communication parameters based on or otherwise associated with one or more other communication parameters. For example, the network node 110 and/or the UE 120 may determine the quantity of channel bits available (for example, for a data channel or a shared channel) based on or otherwise associated with the allocation size, a quantity of resources of the allocation size that are associated with data, and the MCS. For example, the quantity of resources of the allocation size that are associated with data may be based on or otherwise associated with the allocation size and resources allocated for other signaling, such as for DMRS signaling, among other examples.

The MCS may indicate a quantity of bits available for each resource element (RE). For example, time-frequency resources in a radio access network may be partitioned into resource blocks (RBs). An RB is sometimes referred to as a physical resource block (PRB). An RB includes a set of subcarriers and a set of symbols that are schedulable by the network node 110 as a unit. In some aspects, an RB may include a set of subcarriers in a single slot. A single time-frequency resource included in an RB may be referred to as an RE. An RE may include a single subcarrier (for example, in frequency) and a single symbol (for example, in time). A symbol may be referred to as an orthogonal frequency division multiplexing (OFDM) symbol. An RE may be used to transmit one modulated symbol, which may be a real value or a complex value.

For example, the allocation size may indicate that a communication is associated with 240 REs, 40 of which are associated with DMRSs (for example, 200 REs are associated with data). The MCS may indicate that 6 bits are available for each RE. Therefore, the UE 120 and/or the network node 110 may determine that the communication is associated with 1,200 channel bits (for example, 6 multiplied by 200 equals 1,200). The channel bits indicate a quantity of bits available for data for a given communication. Additionally, the MCS may indicate a code rate associated with the communication. The code rate (or coding rate) may indicate a ratio between a quantity of information bits (or data bits) and the quantity of channel bits (for example, a ratio between information bits and total transmitted bits). If the code rate for the communication is ⅔ and using the example of 1,200 channel bits, then the network node 110 and/or the UE 120 may determine that a quantity of information bits associated with the communication is 800 bits (for example, 1,200 multiplied by ⅔).

In a fourth operation 520, the UE 120 and/or the network node 110 may select one or more parameters (also referred to herein as "code parameter(s)") for a product code (for example, a BCH product code) to be associated with the communication based on or otherwise associated with the one or more communication parameters. In some aspects, both the UE 120 and the network node 110 may select the one or more parameters, as described herein. In other aspects, only one of the UE 120 and the network node 110 may select the one or more parameters, as described herein. For example, a transmitter (for example, a device encoding a communication using the BCH product code) may select the one or more parameters.

For example, the one or more parameters may include a quantity of columns associated with the BCH product code. The quantity of columns may also be referred to as a BCH code length. For example, as shown in FIG. 5B, the BCH product code may be associated with a grid consisting of columns and rows. In some aspects, the BCH product code may be associated with encoding a communication in a first dimension (for example, the rows dimension) using first coding (for example, first BCH coding) and encoding the communication in a second dimension (for example, the columns dimension) using a second coding (for example, a second BCH coding). As described elsewhere herein the first coding and the second coding may be different or the same. In some aspects, entries (or elements) of the grid may be mapped to respective bits of the channel bits associated with the communication. In other words, each entry (or element) in the grid may be associated with a single bit.

For example, the quantity of columns may be based on or otherwise associated with the quantity of channel bits of the communication. As described elsewhere herein, the quantity of channel bits may be associated with the allocation size and the MCS of the communication. For example, each grid (for example, which may also be referred to as a BCH component) may be associated with a quantity of columns and a quantity of rows to enable at least the quantity of channel bits to be mapped to the grid. This may ensure that the BCH product code is able to handle the quantity of channel bits associated with a given communication. In some aspects, the quantity of columns and the quantity of rows may be selected such that the quantity of entries of the grid (for example, the quantity of columns multiplied by the quantity of rows) is greater than the quantity of channel bits and forms as close to a square as possible (for example, such that the quantity of columns and the quantity of rows are the same value or are similar values). This ensures that coding of the rows and columns is associated with similar codeword lengths and/or complexity.

In some aspects, the quantity of columns may be selected and/or determined based on or otherwise associated with the quantity of channel bits of the communication. For example, the quantity of columns may be defined as $$\#\_Columns = 2^{round\left(\left(\frac{log_2(Channel_{Bits})}{2}\right)\right)} - 1,$$

where #_Columns is the quantity of columns, Channel_Bits is the quantity of channel bits, and round( ) is a function associated with rounding a value to a nearest integer. The quantity of rows may be selected and/or determined based on or otherwise associated with the quantity of channel bits of the communication and the quantity of columns. For example, the quantity of rows may be defined as $$\#\_rows = ceil\left(\frac{Channel\_Bits}{\#\_Columns}\right),$$

where #_rows is the quantity of rows, and ceil( ) is a function (for #_Columns example, a ceiling function) associated with rounding a value to a next highest integer (for example, rounding a value up to the next highest integer). This ensures that the grid has enough entries to handle at least the quantity of channel bits associated with the communication.

In some aspects, the grid may have more entries than the quantity of channel bits. Excess bits or filler bits (for example, a difference between the quantities of entries in the grid and the quantity of channel bits) may be defined as Filler_bits=(#_Columns×#_rows)−Channel_Bits, where Filler bits is the quantity of filler bits. The filler bits may not actually be transmitted by a transmitter because that would result in a greater quantity of bits than the available channel bits associated with the communication.

The one or more parameters associated with the BCH product code may include a correction capability associated with the BCH product code. The correction capability may be based on or otherwise associated with a quantity of information bits that are associated with the communication. For example, BCH codes may be designed to be capable of correcting a given quantity of errors (for example, bit errors). The BCH code may be designed to maximize the correction capability associated with the BCH product code while also ensuring that the BCH product code is associated with at least a quantity of information bits associated with the communication. This ensures that the transmitter can transmit at least the quantity of information bits for a given communication or transport block. For example, the correction capability (t) associated with the BCH product code may be defined such that a quantity of information bits available in the grid is greater than or equal to the quantity of information bits for a given communication or transport block. For example, the UE 120 and/or the network node 110 may determine a highest value of t (for example, the correction capability) that satisfies the quantity of information bits available in the grid is greater than or equal to the quantity of information bits for a given communication or transport block for the following equations:

$$\text{\# of rows for parity} = t \times \text{ceil}(\log_2(\text{\#\_rows}))$$

$$\text{\# of rows for info} = \text{\#\_rows} - \text{\# of rows for parity}$$

$$\text{Info bits remaing} =$$

$$(\text{\# of rows for info} \times (\text{\#}_{Columns} - t \times \log_2(\text{\#\_Columns} + 1))) - \text{Filler\_bits}$$

where #of rows for parity is a quantity of rows of the grid to be associated with parity bits, #of rows for info is a quantity of rows of the grid to be associated with information bits, and Info bits remaining is the quantity of information bits available in the grid. The value of t may be a quantity of errors that are correctable using the BCH product code. For example, the value of t may be a quantity of correctable errors for each column and each row of the grid associated with the BCH product code. In some aspects, the correction capability (for example, t) may be based on or otherwise associated with a target block error rate (BLER) and/or target undetectable error probability, among other examples, associated with the communication. For example, the network node 110 and/or the UE 120 may select a value of t so that a value of 1/t! is at least an order of magnitude less than a target BLER and/or a target undetectable error probability.

The UE 120 and/or the network node 110 may determine a highest value of t where Info bits remaining≥Info bits, where Info bits is the quantity of information bits for a given communication or transport block. Parity bits may also be referred to as redundant bits or check bits. In some aspects, Info bits remaining may be greater than Info bits. In such examples, there may be one or more unutilized bits in the grid. In other words, an encoded communication may include one or more bits (for example, unutilized bits) that are not associated with information bits or parity bits. In such examples, the transmitter (for example, the network node 110 or the UE 120) may perform one or more optimizations using the one or more unutilized bits to improve the performance of the BCH product code. For example, the one or more unutilized bits may be used to improve a correction capability for one or more rows (or columns) of the grid associated with the BCH product code. For example, one or more rows of the grid may be associated with a second correction capability.

A quantity of the one or more rows may be based on or otherwise associated with a difference between the quantity of available information bits (Info bits remaining) and the quantity of information bits that are associated with the communication (Info bits). For example, the quantity of unutilized bits may be Unutilized bits=Info bits remaining−Info bits. The quantity of the one or more rows to be associated with the second (for example, improved) correction capability may be $$\text{Additional rows} = \text{floor}\left(\frac{\text{Unutilized bits}}{\log_2(\text{\#\_Columns} + 1)}\right),$$

where Additional rows is the quantity of the one or more rows to be associated with the second (for example, improved) correction capability, and floor( ) is a function (for example, a floor function) associated with rounding a value to a next lowest integer (for example, rounding a value down to the next lowest integer).

In some aspects, after using the one or more unutilized bits to improve the correction capability associated with one or more rows, there may still be utilized bits left. For example, the quantity of unutilized bits may be Unutilized bits=Info bits remaining−Info bits−Additional rows×log$_2$ (#_Columns+1). The transmitter (for example, the UE 120 or the network node 110) may perform one or more optimizations using the one or more unutilized bits to improve the performance of the BCH product code (for example, to utilize the unutilized bits).

For example, as shown in FIG. 5B, the unutilized bits may be used as additional parity bits for one or more rows of the grid. This improves a correction capability associated with the one or more rows and decreases a decoding complexity associated with the one or more rows. As shown in FIG. 5B, the first two rows of the grid may be the Additional rows. For example, the first two rows (for example, a first two codewords corresponding to the first two rows) may have a better error correction capability than other rows in the grid (for example, a value of t for the first two rows may be higher than other rows in the grid). For example, the first two rows may support a correction capability of t+1.

As shown in FIG. 5B, the grid may be defined such that a last one or more rows and/or a last one or more columns are associated with parity bits. For example, the example grid depicted in FIG. 5B includes two rows associated with parity bits and two columns associated with parity bits. In other examples, more or less rows and/or columns may be associated with parity bits. As described elsewhere herein, the Additional rows (for example, the first two rows as depicted in FIG. 5B) may be associated with additional parity bits to improve a correction capability of codewords associated with the Additional rows. In some aspects, one or more filler bits may be mapped to a first one or more entries in a first row of the grid. As another example, the one or more filler bits may be mapped to a first one or more entries in a first column of the grid. The one or more filler bits may not actually be transmitted as part of an encoded communication (for example, because they are excess bits above a quantity of available channel bits for the communication). Therefore, the one or more filler bits may be set to a known value (for example, known by the network node 110 and the UE 120), such as a value of one (1). An encoded communication may not include the filler bit(s), but the receiver (for example, the UE 120 in the example described herein) may input the known value of the filler bit(s) when decoding the encoded communication. The remaining entries in the grid may be associated with information bits (for example, data to be communicated between the UE 120 and the network node 110).

Returning to FIG. 5A, the transmitter (for example, the network node 110 as depicted in FIG. 5A) and the receiver (for example, the UE 120 as depicted in FIG. 5A) may perform one or more operations to encode and/or decode data using the BCH product code. For example, the transmitter may perform a fifth operation 525 (for example, to encode data) and a sixth operation 530 (for example, transmitting encoded data). The receiver may receive the encoded data as part of the sixth operation 530 and may decode the encoded data in a seventh operation 535. In other words, if the UE 120 is the transmitter and the network node 110 is the receiver (for example, in contrast to the example depicted in FIG. 5A), then the UE 120 may perform the fifth operation 525 (for example, in a similar manner as described herein), and the network node 110 may perform the seventh operation 535 (in a similar manner as described herein).

In the fifth operation 525, the network node 110 may encode the communication using the one or more parameters for the BCH product code (for example, the parameter(s) selected as part of the fourth operation 520). For example, the network node 110 may encode the communication using the grid generated as described elsewhere herein (for example, the grid having a size defined by the quantity of columns and the quantity of rows as determined and/or selected as described elsewhere herein, such as in connection with the fourth operation 520). For example, the network node 110 may map information bits and parity bits associated with the communication to the grid associated with the BCH product code. The network node 110 may encode columns of the grid and rows of the grid (for example, separately) using the BCH product code to generate the encoded communication. For example, a BCH code may be used to encode the rows of the grid (for example, to generate a first one or more codewords), and the BCH code (or another code) may be used to encode the columns of the grid (for example, to generate a second one or more codewords). For example, each row and each column may be associated with a codeword (for example, the rows may be associated with respective codewords, and the columns may be associated with respective codewords).

For example, the network node 110 may map information bits of the communication (for example, of a transport block) to the grid associated with the BCH product code. The network node 110 may generate the parity bits based on or otherwise associated with information bits. For example, for parity bits of a given row of the grid, the network node 110 may generate the parity bits (for example, using a BCH code) using the information bits included in the given row. Similarly, for parity bits of a given column of the grid, the network node 110 may generate the parity bits (for example, using a BCH code) using the information bits included in the given column. In some aspects, the network node 110 may first generate the parity bits for rows of the grid. After generating and mapping the parity bits for the rows, the network node 110 may first generate the parity bits for columns of the grid. In other aspects, the network node 110 may first generate the parity bits for the columns and may generate the parity bits of the rows after generating the parity bits for the columns.

For example, the network node 110 may encode rows of the grid using the BCH product code to generate a first one or more codewords of an encoded communication. The network node 110 may encode columns of the grid using the BCH product code to generate a second one or more codewords of the encoded communication. As described elsewhere herein, the code used to encode the rows and the columns may be the same code or different codes. The encoded communication may include the first one or more codewords and the second one or more codewords.

In the sixth operation 530, the network node 110 may transmit, and the UE 120 may receive, the encoded communication. For example, the encoded communication may be communicated in an over-the-air communication. In some aspects, the encoded communication may be a data communication (for example, that is communicated via a data channel or a shared channel). In other aspects, the encoded communication may be a control communication (for example, that is communicated via a control channel). The encoded communication may be a downlink communication (for example, as shown in FIG. 5A). In other aspects, the encoded communication may be an uplink communication (for example, if the UE 120 is the transmitter).

In the seventh operation 535, the UE 120 may decode the encoded communication using the one or more parameters of the BCH product code. For example, the UE 120 may decode the encoded communication using the BCH product code and the one or more parameters that are associated with the one or more communication parameters of the communication (for example, the one or more parameters that are selected and/or determined as part of the fourth operation 520). For example, the UE 120 may decode, using the BCH product code, one or more encoded rows of the grid associated with the BCH product code. The UE 120 may decode, using the BCH product code, the one or more encoded columns if at least one of the one or more encoded rows is not successfully decoded. For example, the UE 120 may iteratively decode the one or more encoded rows followed by decoding the one or more encoded columns.

For example, the UE 120 may perform an HD decoding operation. HD decoding may be associated with decoding each bit of an encoded communication considering the value of each bit as one of a fixed set of possible values (for example, one or zero). For example, the UE 120 may decode the encoded communication by first decoding all rows of the BCH code (for example, of the encoded communication). If the quantity of errors in a given row is less than or equal to the correction capability for that row, then the decoding may be successful (for example, the UE 120 may be able to correct errors of bits in the that row using the parity bits). If the quantity of errors in a given row is less than or equal to the correction capability for that row, then the decoding may fail. If the UE 120 is able to successfully decode all rows of the BCH product code (for example, all rows of the grid), then the decoding operation may stop (for example, the encoded communication is successfully decoded in such examples).

If one or more rows are not successfully decoded by the UE 120, then the UE 120 may attempt to decode the columns of the BCH product code (for example, columns of the grid). If the quantity of errors in a given column is less than or equal to the correction capability for that column, then the decoding may be successful (for example, the UE 120 may be able to correct errors of bits in the that column using the parity bits). If the quantity of errors in a given column is less than or equal to the correction capability for that column, then the decoding may fail. If all of the columns are successfully decoded, then the decoding operation may stop (for example, the encoded communication is successfully decoded in such examples). If one or more columns are not successfully decoded by the UE 120, then the UE 120 may perform the decoding operation again (for example, in an iterative manner). For example, after correcting errors during a first iteration of decoding the rows and columns, the UE 120 may attempt to decode the rows followed by the columns in a similar manner as described above. In other examples, the UE 120 may first decode the columns and may decode the rows after attempting to decode the columns, in a similar manner as described above.

The UE 120 may continue to iteratively decode the encoded communication (for example, where an iteration includes decoding (and correcting errors if possible) for the rows of the grid followed by decoding (and correcting errors if possible) for the columns of the grid). In some aspects, the UE 120 may perform Niterations of the decoding operation (for example, where a value of Nis configured by the network node 110 and/or defined, or otherwise fixed, by a wireless communication standard, such as the 3GPP). If the UE 120 is unable to successfully decode the encoded communication after N iterations, then the UE 120 may determine that the decoding operation is unsuccessful.

Additionally or alternatively, the UE 120 may perform one or more SD decoding operations. SD decoding may be associated with decoding each bit of an encoded communication considering the value of each bit as a range of possible values. For example, HD decoding may be associated with the UE 120 comparing a received codeword with all possible codewords and the codeword which gives a smallest Hamming distance may be selected. SD decoding may be associated with the UE 120 comparing a received codeword with all possible codewords and the codeword which gives a smallest Euclidean distance may be selected.

In some aspects, the one or more SD decoding operation may include flipping a log likelihood ratio (LLR) value for one or more entries of a code block (or codeword) of the encoded communication. For example, the UE 120 may select $X_1$ LLRs in a code block (or codeword) with the lowest absolute values. The UE 120 may flip (for example, randomly) $X_2$ LLRs from the $X_1$ LLRs. Flipping LLRs of bits of the encoded communication may improve a correction capability of a codeword or code block. In some aspects, the UE 120 may flip (for example, randomly) LLRs for all rows and all columns of the grid associated with the BCH product code. For example, for each row, the UE 120 may select $X_1$ LLRs (for example, the $X_1$ lowest LLRs from a given row) and may randomly flip $X_2$ LLRs from the $X_1$ LLRs. Similarly, for each column, the UE 120 may select $X_1$ LLRs (for example, the $X_1$ lowest LLRs from a given column) and may randomly flip $X_2$ LLRs from the $X_1$ LLRs. After flipping the LLRs, the UE 120 may attempt to decode the encoded communication using HD decoding operation (s) (for example, in a similar manner as described above).

In some aspects, the UE 120 may perform the SD decoding operation(s) only for rows and/or columns that were not successfully decoded after performing one or more iterations of the HD decoding operation(s). For example, the UE 120 may perform the SD decoding operation(s) only for rows and/or columns that were not successfully decoded after performing Miterations of the HD decoding operation(s) (for example, where M is less than N). In some aspects, the UE 120 may perform L iterations of the one or more SD decoding operations. The values of M, N and L may be configured by the network node 110, defined (or otherwise fixed) by a wireless communication standard (for example, the 3GPP), and/or stored in a memory of the UE 120 (for example, configured in an original equipment manufacturer (OEM) configuration).

The use of the BCH product code, as described herein, mitigates the problems of traditional ECCs (such as LDPC codes) by exploiting the subdivision of one large product code into small component codes of limited correction capability. These small codes, which may be short BCH codes, are organized into the grid structure described herein within a higher-level product code, which enables the use of multiple-iteration decoding to provide error correction capability close to that of a conventional decoder in an ECC (for example, close to that of LDPC codes), but with a much lower implementation cost due to the reduction of the hardware components that process the individual codes of each codeword or code block (for example, of each row and/or column of the grid). For example, the code blocks or codewords of the BCH product code may be smaller than the code blocks of codewords of traditional ECCs, such as LDPC codes (for example, thereby conserving power associated with the coding, reducing a complexity of the coding, and/or reducing a size of hardware components that process the individual codes of each codeword or code block).

Additionally, because the coding is performed at a transport block level, one or more cyclic redundancy check (CRC) bits may not be included in the encoded communication. This conserves resources (for example, network resources or channel bits) that would have otherwise been used to transmit the CRC bits. In some aspects, because the coding is performed for a transport block and because the rows and columns of the grid may be encoded as subparts of one large product code (for example, the entire grid), a code length of the BCH product code may be associated with (or may be) the entire transport block (for example, and not a code block length as is the case with other ECCs, such as LDPC codes). A longer code length may be associated with improved coding performance as compared to shorter code lengths. Therefore, because in traditional ECC codes, a transport block may be broken up into different code blocks, the code length may be shorter than the BCH product code (for example, where the transport block is encoded in a product code that includes the grid associated with the BCH product code). As a result, the BCH product code may have an improved coding performance as compared to other ECCs, such as LDPC codes.

Further, because the transport block may be divided into small code blocks or codewords (for example, defined by the rows and columns of the grid), feedback (for example, acknowledgement (ACK) or negative ACK (NACK) feedback) may be provided only for code blocks or codewords that were not successfully decoded (for example, by the UE 120). For example, after attempting to decode the communication (for example, in the seventh operation 535), the UE 120 may identify one or more codewords or code blocks that were not successfully decoded (for example, one or more rows and/or one or more columns of the grid that were not successfully decoded). The UE 120 may transmit, and the network node 110 may receive, feedback information indicating that the one or more codewords or code blocks were not successfully decoded. This may enable the network node 110 to retransmit information for the one or more codewords or code blocks that were not successfully decoded (for example, rather than retransmitting the entire encoded communication). This conserves resources (for example, network resources) that would have otherwise been used to retransmit the entire encoded communication.

FIG. 6 is a flowchart illustrating an example process 600 performed, for example, by a transmitter that supports a product code for wireless communications in accordance with the present disclosure. Example process 600 is an example where the transmitter (for example, the UE 120 or the network node 110) performs operations associated with a product code for wireless communications.

As shown in FIG. 6, in some aspects, process 600 may include transmitting or receiving, to or from a receiver, an indication of one or more communication parameters associated with a communication, the one or more communication parameters including at least one of an allocation size or an MCS (block 610). For example, the transmitter (such as by using communication manager 808, reception component 802, or transmission component 804, depicted in FIG. 8) may transmit or receive, to or from a receiver, an indication of one or more communication parameters associated with a communication, the one or more communication parameters including at least one of an allocation size or an MCS, as described above.

As further shown in FIG. 6, in some aspects, process 600 may include transmitting, to the receiver and using the one or more communication parameters, an encoded communication obtained by encoding the communication using a BCH product code, the BCH product code being associated with one or more code parameters that are associated with the one or more communication parameters (block 620). For example, the transmitter (such as by using communication manager 808 or transmission component 804, depicted in FIG. 8) may transmit, to the receiver and using the one or more communication parameters, an encoded communication obtained by encoding the communication using a BCH product code, the BCH product code being associated with one or more code parameters that are associated with the one or more communication parameters, as described above.

Process 600 may include additional aspects, such as any single aspect or any combination of aspects described below or in connection with one or more other processes described elsewhere herein.

In a first additional aspect, the one or more code parameters include a quantity of columns associated with the BCH product code, and the quantity of columns is associated with a quantity of channel bits of the communication, the quantity of channel bits being associated with the allocation size and the MCS.

In a second additional aspect, alone or in combination with the first aspect, the one or more code parameters include a quantity of rows associated with the BCH product code, and the quantity of rows is associated with the quantity of channel bits and the quantity of columns.

In a third additional aspect, alone or in combination with one or more of the first and second aspects, process 600 includes mapping information bits and parity bits associated with the communication to a grid associated with the BCH product code, the grid having a size defined by the quantity of columns and the quantity of rows, and encoding columns of the grid and rows of the grid using the BCH product code to generate the encoded communication.

In a fourth additional aspect, alone or in combination with one or more of the first through third aspects, the one or more code parameters include a correction capability associated with the BCH product code, and the correction capability is associated with a quantity of information bits that are associated with the communication, the quantity of information bits being associated with a quantity of channel bits of the communication and the MCS.

In a fifth additional aspect, alone or in combination with one or more of the first through fourth aspects, the correction capability is associated with a quantity of available information bits in a grid associated with the BCH product code being greater than or equal to the quantity of information bits that are associated with the communication.

In a sixth additional aspect, alone or in combination with one or more of the first through fifth aspects, the correction capability is a first communication capability, where one or more rows of the grid are associated with a second correction capability, and where a quantity of the one or more rows is associated with a difference between the quantity of available information bits and the quantity of information bits that are associated with the communication.

In a seventh additional aspect, alone or in combination with one or more of the first through sixth aspects, the indication of the one or more communication parameters is communicated in downlink control information that schedules the communication.

In an eighth additional aspect, alone or in combination with one or more of the first through seventh aspects, the indication of the one or more communication parameters is communicated in a radio resource control communication or a MAC control element communication.

In a ninth additional aspect, alone or in combination with one or more of the first through eighth aspects, the communication is associated with a transport block, and process 600 includes mapping information bits of the transport block to a grid associated with the BCH product code, encoding rows of the grid using the BCH product code to generate a first one or more codewords of the encoded communication, and encoding columns of the grid using the BCH product code to generate a second one or more codewords of the encoded communication.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

FIG. 7 is a flowchart illustrating an example process 700 performed, for example, by a receiver that supports a product code for wireless communications in accordance with the present disclosure. Example process 700 is an example where the receiver (for example, the UE 120 or the network node 110) performs operations associated with a product code for wireless communications.

As shown in FIG. 7, in some aspects, process 700 may include transmitting or receiving, to or from a transmitter, an indication of one or more communication parameters associated with a communication, the one or more communication parameters including at least one of an allocation size or an MCS (block 710). For example, the receiver (such as by using communication manager 908, reception component 902, or transmission component 904, depicted in FIG. 9) may transmit or receive, to or from a transmitter, an indication of one or more communication parameters associated with a communication, the one or more communication parameters including at least one of an allocation size or an MCS, as described above.

As further shown in FIG. 7, in some aspects, process 700 may include receiving, from the transmitter and using the one or more communication parameters, an encoded communication, of the communication (block 720). For example, the receiver (such as by using communication manager 908 or reception component 902, depicted in FIG. 9) may receive, from the transmitter and using the one or more communication parameters, an encoded communication, of the communication, as described above.

As further shown in FIG. 7, in some aspects, process 700 may include decoding the encoded communication using a BCH product code, the BCH product code being associated with one or more code parameters that are associated with the one or more communication parameters (block 730). For example, the receiver (such as by using communication manager 908 or decoding component 910, depicted in FIG. 9) may decode the encoded communication using a BCH product code, the BCH product code being associated with one or more code parameters that are associated with the one or more communication parameters, as described above.

Process 700 may include additional aspects, such as any single aspect or any combination of aspects described below or in connection with one or more other processes described elsewhere herein.

In a first additional aspect, the one or more code parameters include a quantity of columns associated with the BCH product code, and the quantity of columns is associated with a quantity of channel bits of the communication, the quantity of channel bits being associated with the allocation size and the MCS.

In a second additional aspect, alone or in combination with the first aspect, the one or more code parameters include a quantity of rows associated with the BCH product code, and the quantity of rows is associated with the quantity of channel bits and the quantity of columns.

In a third additional aspect, alone or in combination with one or more of the first and second aspects, the one or more code parameters include a correction capability associated with the BCH product code, and the correction capability is associated with a quantity of information bits that are associated with the communication, the quantity of information bits being associated with a quantity of channel bits of the communication and the MCS.

In a fourth additional aspect, alone or in combination with one or more of the first through third aspects, the correction capability is associated with a quantity of available information bits in a grid associated with the BCH product code being greater than or equal to the quantity of information bits that are associated with the communication.

In a fifth additional aspect, alone or in combination with one or more of the first through fourth aspects, the correction capability is a first communication capability, where one or more rows of the grid are associated with a second correction capability, and where a quantity of the one or more rows is associated with a difference between the quantity of available information bits and the quantity of information bits that are associated with the communication.

In a sixth additional aspect, alone or in combination with one or more of the first through fifth aspects, the correction capability is associated with at least one of a target block error rate or target undetectable error probability associated with the communication.

In a seventh additional aspect, alone or in combination with one or more of the first through sixth aspects, receiving the encoded communication includes decoding, using the BCH product code, the encoded communication to obtain the communication.

In an eighth additional aspect, alone or in combination with one or more of the first through seventh aspects, the encoded communication includes a grid that includes one or more encoded rows and one or more encoded columns, and decoding the encoded communication includes decoding, using the BCH product code, the one or more encoded rows, and decoding, using the BCH product code, the one or more encoded columns if at least one of the one or more encoded rows is not successfully decoded.

In a ninth additional aspect, alone or in combination with one or more of the first through eighth aspects, the encoded communication includes a grid that includes one or more encoded rows and one or more encoded columns, and decoding the encoded communication includes iteratively decoding the one or more encoded rows followed by decoding the one or more encoded columns.

In a tenth additional aspect, alone or in combination with one or more of the first through ninth aspects, decoding the encoded communication includes flipping an LLR value for one or more entries of a code block of the encoded communication, and decoding, using the BCH product code, the code block after flipping the LLR value for the one or more entries.

In an eleventh additional aspect, alone or in combination with one or more of the first through tenth aspects, the indication of one or more communication parameters is communicated in downlink control information that schedules the communication.

In a twelfth additional aspect, alone or in combination with one or more of the first through eleventh aspects, the indication of one or more communication parameters is communicated in a radio resource control communication or a MAC control element communication.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
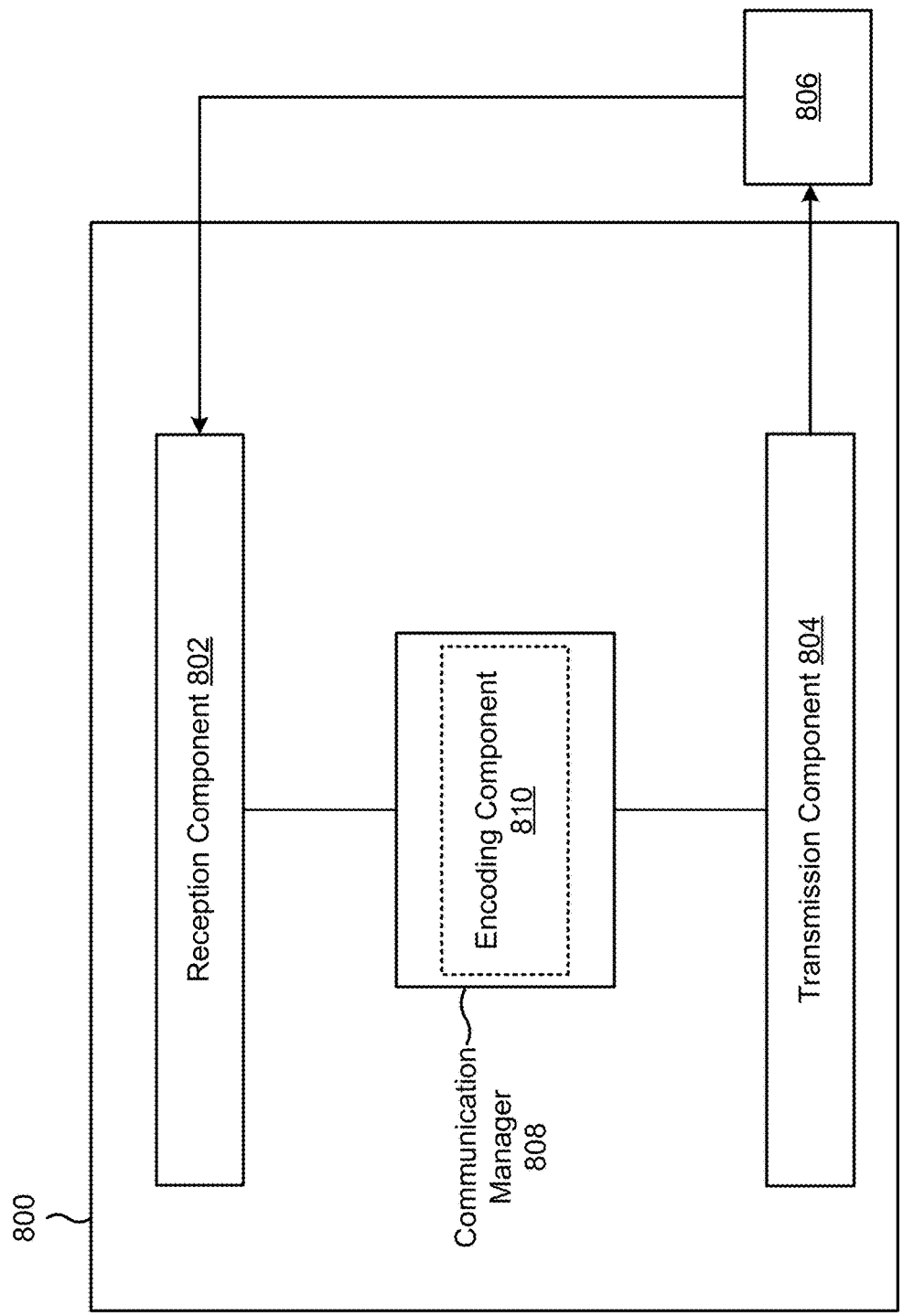
FIG. 8 is a diagram of an example apparatus for wireless communication that supports a product code for wireless communications in accordance with the present disclosure.

FIG. 8 is a diagram of an example apparatus 800 for wireless communication that supports a product code for wireless communications in accordance with the present disclosure. The apparatus 800 may be a transmitter, or a transmitter may include the apparatus 800. In some aspects, the apparatus 800 includes a reception component 802, a transmission component 804, and a communication manager 808, which may be in communication with one another (for example, via one or more buses). In some aspects, the communication manager 808 may include the communication manager 140 (for example, if the UE 120 is the transmitter) or the communication manager 150 (for example, if the network node 110 is the transmitter). As shown, the apparatus 800 may communicate with another apparatus 806 (such as a UE, a network node, or another wireless communication device) using the reception component 802 and the transmission component 804.

In some aspects, the apparatus 800 may be configured to and/or operable to perform one or more operations described herein in connection with FIGS. 5A and 5B. Additionally or alternatively, the apparatus 800 may be configured to and/or operable to perform one or more processes described herein, such as process 600 of FIG. 6. In some aspects, the apparatus 800 may include one or more components of the transmitter described above in connection with FIG. 2.

The reception component 802 may receive communications, such as reference signals, control information, and/or data communications, from the apparatus 806. The reception component 802 may provide received communications to one or more other components of the apparatus 800, such as the communication manager 808. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, and/or a memory of the transmitter described above in connection with FIG. 2.

The transmission component 804 may transmit communications, such as reference signals, control information, and/or data communications, to the apparatus 806. In some aspects, the communication manager 808 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, and/or a memory of the transmitter described above in connection with FIG. 2. In some aspects, the transmission component 804 may be co-located with the reception component 802 in a transceiver.

The communication manager 808 may communicate, with a receiver, an indication of one or more communication parameters associated with a communication, the one or more communication parameters including at least one of an allocation size or an MCS. The communication manager 808 may transmit or may cause the transmission component 804 to transmit, to the receiver and using the one or more communication parameters, an encoded communication, of the communication, that is encoded using a BCH product code, the BCH product code being associated with one or more code parameters that are associated with the one or more communication parameters. In some aspects, the communication manager 808 may perform one or more operations described elsewhere herein as being performed by one or more components of the communication manager 808.

The communication manager 808 may include a controller/processor, a memory, a scheduler, and/or a communication unit of the transmitter described above in connection with FIG. 2. In some aspects, the communication manager 808 includes a set of components, such as an encoding component 810. Alternatively, the set of components may be separate and distinct from the communication manager 808. In some aspects, one or more components of the set of components may include or may be implemented within a controller/processor, a memory, a scheduler, and/or a communication unit of the transmitter described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 and/or the transmission component 804 may communicate, with a receiver, an indication of one or more communication parameters associated with a communication, the one or more communication parameters including at least one of an allocation size or an MCS. The transmission component 804 may transmit, to the receiver and using the one or more communication parameters, an encoded communication, of the communication, that is encoded using a BCH product code, the BCH product code being associated with one or more code parameters that are associated with the one or more communication parameters.

The encoding component 810 may encode the communication, using the one or more code parameters associated with the BCH code, to generate the encoded communication. The encoding component 810 may map information bits of the transport block to a grid associated with the BCH product code. The encoding component 810 may encode rows of the grid using the BCH product code to generate a first one or more codewords of the encoded communication. The encoding component 810 may encode columns of the grid using the BCH product code to generate a second one or more codewords of the encoded communication.

The encoding component 810 may select the one or more code parameters based on or otherwise associated with the one or more communication parameters.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
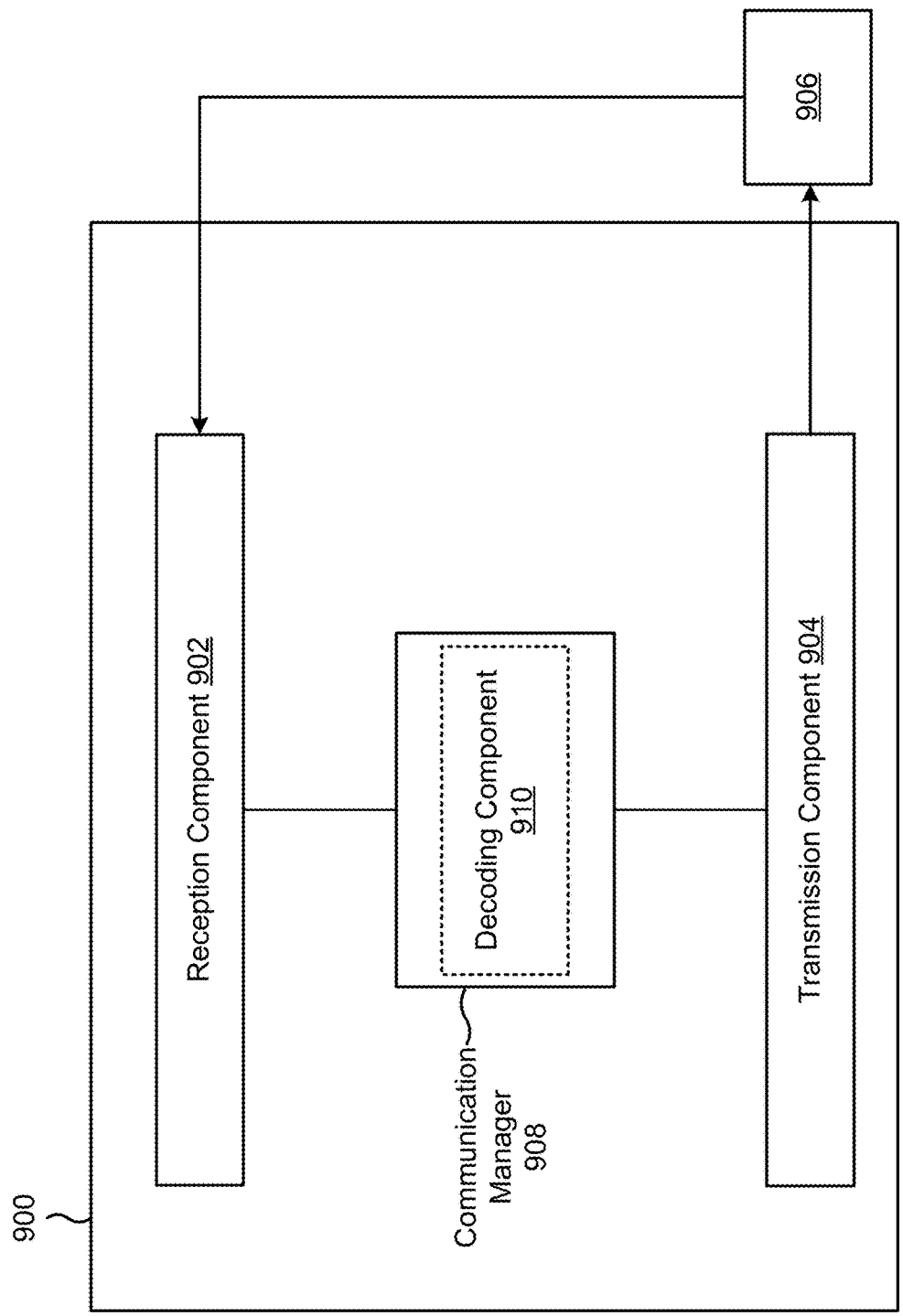
FIG. 9 is a diagram of an example apparatus for wireless communication that supports a product code for wireless communication in accordance with the present disclosure.

FIG. 9 is a diagram of an example apparatus 900 for wireless communication that supports a product code for wireless communication in accordance with the present disclosure. The apparatus 900 may be a receiver, or a receiver may include the apparatus 900. In some aspects, the apparatus 900 includes a reception component 902, a transmission component 904, and a communication manager 908, which may be in communication with one another (for example, via one or more buses). In some aspects, the communication manager 908 may include the communication manager 140 (for example, if the UE 120 is the receiver) or the communication manager 150 (for example, if the network node 110 is the receiver). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIGS. 5A and 5B. Additionally or alternatively, the apparatus 900 may be configured to and/or operable to perform one or more processes described herein, such as process 700 of FIG. 7. In some aspects, the apparatus 900 may include one or more components of the receiver described above in connection with FIG. 2.

The reception component 902 may receive communications, such as reference signals, control information, and/or data communications, from the apparatus 906. The reception component 902 may provide received communications to one or more other components of the apparatus 900, such as the communication manager 908. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the receiver described above in connection with FIG. 2.

The transmission component 904 may transmit communications, such as reference signals, control information, and/or data communications, to the apparatus 906. In some aspects, the communication manager 908 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the receiver described above in connection with FIG. 2. In some aspects, the transmission component 904 may be co-located with the reception component 902 in a transceiver.

The communication manager 908 may communicate, with a transmitter, an indication of one or more communication parameters associated with a communication, the one or more communication parameters including at least one of an allocation size or an MCS. The communication manager 908 may receive or may cause the reception component 902 to receive, from the transmitter and using the one or more communication parameters, an encoded communication, of the communication. The communication manager 908 may decode the encoded communication using a BCH product code, the BCH product code being associated with one or more code parameters that are associated with the one or more communication parameters. In some aspects, the communication manager 908 may perform one or more operations described elsewhere herein as being performed by one or more components of the communication manager 908.

The communication manager 908 may include a controller/processor, a memory, a scheduler, and/or a communication unit of the receiver described above in connection with FIG. 2. In some aspects, the communication manager 908 includes a set of components, such as a decoding component 910. Alternatively, the set of components may be separate and distinct from the communication manager 908. In some aspects, one or more components of the set of components may include or may be implemented within a controller/processor, a memory, a scheduler, and/or a communication unit of the receiver described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 and/or the transmission component 904 may communicate, with a transmitter, an indication of one or more communication parameters associated with a communication, the one or more communication parameters including at least one of an allocation size or an MCS. The reception component 902 may receive, from the transmitter and using the one or more communication parameters, an encoded communication, of the communication. The decoding component 910 may decode the encoded communication using a BCH product code, the BCH product code being associated with one or more code parameters that are associated with the one or more communication parameters.

The encoded communication may include a grid that includes one or more encoded rows and one or more encoded columns. The decoding component 910 may decode, using the BCH product code, the one or more encoded rows. The decoding component 910 may decode, using the BCH product code, the one or more encoded columns if at least one of the one or more encoded rows is not successfully decoded. The decoding component 910 may iteratively decode the one or more encoded rows followed by decoding the one or more encoded columns.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a transmitter, comprising: transmitting or receiving, to or from a receiver, an indication of one or more communication parameters associated with a communication, the one or more communication parameters including at least one of an allocation size or a modulation and coding scheme (MCS); and transmitting, to the receiver and using the one or more communication parameters, an encoded communication obtained by encoding the communication using a Bose-Chaudhuri-Hocquenghem (BCH) product code, the BCH product code being associated with one or more code parameters that are associated with the one or more communication parameters.

Aspect 2: The method of Aspect 1, wherein the one or more code parameters include a quantity of columns associated with the BCH product code, and wherein the quantity of columns is associated with a quantity of channel bits of the communication, the quantity of channel bits being associated with the allocation size and the MCS.

Aspect 3: The method of Aspect 2, wherein the one or more code parameters include a quantity of rows associated with the BCH product code, and wherein the quantity of rows is associated with the quantity of channel bits and the quantity of columns.

Aspect 4: The method of Aspect 3, further comprising: mapping information bits and parity bits associated with the communication to a grid associated with the BCH product code, the grid having a size defined by the quantity of columns and the quantity of rows; and encoding columns of the grid and rows of the grid using the BCH product code to generate the encoded communication.

Aspect 5: The method of any of Aspects 1-4, wherein the one or more code parameters include a correction capability associated with the BCH product code, and wherein the correction capability is associated with a quantity of information bits that are associated with the communication, the quantity of information bits being associated with a quantity of channel bits of the communication and the MCS.

Aspect 6: The method of Aspect 5, wherein the correction capability is associated with a quantity of available information bits in a grid associated with the BCH product code being greater than or equal to the quantity of information bits that are associated with the communication.

Aspect 7: The method of Aspect 6, wherein the correction capability is a first communication capability, wherein one or more rows of the grid are associated with a second correction capability, and wherein a quantity of the one or more rows is associated with a difference between the quantity of available information bits and the quantity of information bits that are associated with the communication.

Aspect 8: The method of any of Aspects 1-7, wherein the indication of the one or more communication parameters is communicated in downlink control information that schedules the communication.

Aspect 9: The method of any of Aspects 1-8, wherein the indication of the one or more communication parameters is communicated in a radio resource control communication or a medium access control (MAC) control element communication.

Aspect 10: The method of any of Aspects 1-9, wherein the communication is associated with a transport block, the method further comprising: mapping information bits of the transport block to a grid associated with the BCH product code; encoding rows of the grid using the BCH product code to generate a first one or more codewords of the encoded communication; and encoding columns of the grid using the BCH product code to generate a second one or more codewords of the encoded communication.

Aspect 11: A method of wireless communication performed by a receiver, comprising: transmitting or receiving, to or from a transmitter, an indication of one or more communication parameters associated with a communication, the one or more communication parameters including at least one of an allocation size or a modulation and coding scheme (MCS); and receiving, from the transmitter and using the one or more communication parameters, an encoded communication, of the communication; and decoding the encoded communication using a Bose-Chaudhuri-Hocquenghem (BCH) product code, the BCH product code being associated with one or more code parameters that are associated with the one or more communication parameters.

Aspect 12: The method of Aspect 11, wherein the one or more code parameters include a quantity of columns associated with the BCH product code, and wherein the quantity of columns is associated with a quantity of channel bits of the communication, the quantity of channel bits being associated with the allocation size and the MCS.

Aspect 13: The method of Aspect 12, wherein the one or more code parameters include a quantity of rows associated with the BCH product code, and wherein the quantity of rows is associated with the quantity of channel bits and the quantity of columns.

Aspect 14: The method of any of Aspects 11-13, wherein the one or more code parameters include a correction capability associated with the BCH product code, and wherein the correction capability is associated with a quantity of information bits that are associated with the communication, the quantity of information bits being associated with a quantity of channel bits of the communication and the MCS.

Aspect 15: The method of Aspect 14, wherein the correction capability is associated with a quantity of available information bits in a grid associated with the BCH product code being greater than or equal to the quantity of information bits that are associated with the communication.

Aspect 16: The method of Aspect 15, wherein the correction capability is a first communication capability, wherein one or more rows of the grid are associated with a second correction capability, and wherein a quantity of the one or more rows is associated with a difference between the quantity of available information bits and the quantity of information bits that are associated with the communication.

Aspect 17: The method of any of Aspects 14-16, wherein the correction capability is associated with at least one of a target block error rate or target undetectable error probability associated with the communication.

Aspect 18: The method of any of Aspects 11-17, wherein receiving the encoded communication comprises decoding, using the BCH product code, the encoded communication to obtain the communication.

Aspect 19: The method of any of Aspects 11-18, wherein the encoded communication includes a grid that includes one or more encoded rows and one or more encoded columns, and wherein decoding the encoded communication comprises: decoding, using the BCH product code, the one or more encoded rows; and decoding, using the BCH product code, the one or more encoded columns if at least one of the one or more encoded rows is not successfully decoded.

Aspect 20: The method of any of Aspects 11-19, wherein the encoded communication includes a grid that includes one or more encoded rows and one or more encoded columns, and wherein decoding the encoded communication comprises: iteratively decoding the one or more encoded rows followed by decoding the one or more encoded columns.

Aspect 21: The method of any of Aspects 11-20, wherein decoding the encoded communication comprises: flipping a log likelihood ratio (LLR) value for one or more entries of a code block of the encoded communication; and decoding, using the BCH product code, the code block after flipping the LLR value for the one or more entries.

Aspect 22: The method of any of Aspects 11-21, wherein the indication of one or more communication parameters is communicated in downlink control information that schedules the communication.

Aspect 23: The method of any of Aspects 11-22, wherein the indication of one or more communication parameters is communicated in a radio resource control communication or a medium access control (MAC) control element communication.

Aspect 24: An apparatus for wireless communication at a device, comprising a processor; memory coupled with the processor; and instructions stored in the memory and executable by the processor to cause the apparatus to perform the method of one or more of Aspects 1-10.

Aspect 25: A device for wireless communication, comprising a memory and one or more processors coupled to the memory, the one or more processors configured to perform the method of one or more of Aspects 1-10.

Aspect 26: An apparatus for wireless communication, comprising at least one means for performing the method of one or more of Aspects 1-10.

Aspect 27: A non-transitory computer-readable medium storing code for wireless communication, the code comprising instructions executable by a processor to perform the method of one or more of Aspects 1-10.

Aspect 28: A non-transitory computer-readable medium storing a set of instructions for wireless communication, the set of instructions comprising one or more instructions that, when executed by one or more processors of a device, cause the device to perform the method of one or more of Aspects 1-10.

Aspect 29: An apparatus for wireless communication at a device, comprising a processor; memory coupled with the processor; and instructions stored in the memory and executable by the processor to cause the apparatus to perform the method of one or more of Aspects 11-23.

Aspect 30: A device for wireless communication, comprising a memory and one or more processors coupled to the memory, the one or more processors configured to perform the method of one or more of Aspects 11-23.

Aspect 31: An apparatus for wireless communication, comprising at least one means for performing the method of one or more of Aspects 11-23.

Aspect 32: A non-transitory computer-readable medium storing code for wireless communication, the code comprising instructions executable by a processor to perform the method of one or more of Aspects 11-23.

Aspect 33: A non-transitory computer-readable medium storing a set of instructions for wireless communication, the set of instructions comprising one or more instructions that, when executed by one or more processors of a device, cause the device to perform the method of one or more of Aspects 11-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of" a, b, or c is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A transmitter for wireless communication, comprising:
at least one memory; and
at least one processor communicatively coupled with the at least one memory, the at least one processor operable to cause the transmitter to:
transmit or receive, to or from a receiver, an indication of one or more communication parameters related to transmission of a communication, the one or more communication parameters including at least one of an allocation size or a modulation and coding scheme (MCS);
encode the communication using a Bose-Chaudhuri-Hocquenghem (BCH) product code, a BCH component of the BCH product code comprising a grid in accordance with one or more code parameters for the BCH product code, a quantity of elements of the grid being in accordance with the one or more communication parameters; and
transmit, to the receiver and using the one or more communication parameters, the encoded communication.

2. The transmitter of claim 1,
wherein the one or more code parameters include a quantity of columns of the grid, wherein the quantity of columns is in accordance with a quantity of channel bits of the communication, and wherein the quantity of channel bits indicate a quantity of bit available for data in accordance with the allocation size and the MCS.

3. The transmitter of claim 2,
wherein the one or more code parameters include a quantity of rows of the grid, and wherein the quantity of rows is in accordance with the quantity of channel bits and the quantity of columns.

4. The transmitter of claim 3, wherein the at least one processor is further operable to cause the transmitter to:

map information bits and parity bits related to the communication to the grid, the grid having a size defined by the quantity of columns and the quantity of rows; and
encode columns of the grid and rows of the grid using the BCH product code to generate the encoded communication.

5. The transmitter of claim 1,
wherein the one or more code parameters include a correction capability for the BCH product code, and wherein the correction capability is related to a quantity of information bits included in the communication, the quantity of information bits being related to a quantity of channel bits of the communication and the MCS.

6. The transmitter of claim 5,
wherein the correction capability is defined in accordance with a quantity of available information bits in the grid being greater than or equal to the quantity of information bits included in the communication.

7. The transmitter of claim 6,
wherein the correction capability is a first communication capability, wherein one or more rows of the grid are related to a second correction capability, and wherein a quantity of the one or more rows is defined in accordance with a difference between the quantity of available information bits and the quantity of information bits that are included in the communication.

8. The transmitter of claim 1,
wherein the indication of the one or more communication parameters is communicated in downlink control information that schedules the communication.

9. The transmitter of claim 1,
wherein the communication comprises a transport block, and wherein the at least one processor is further operable to cause the transmitter to:
map information bits of the transport block to the grid;
encode rows of the grid using the BCH product code to generate a first one or more codewords of the encoded communication; and
encode columns of the grid using the BCH product code to generate a second one or more codewords of the encoded communication.

10. A receiver for wireless communication, comprising:
at least one memory; and
at least one processor communicatively coupled with the at least one memory, the at least one processor operable to cause the receiver to:
transmit or receive, to or from a transmitter, an indication of one or more communication parameters related to reception of a communication, the one or more communication parameters including at least one of an allocation size or a modulation and coding scheme (MCS);
receive, from the transmitter and using the one or more communication parameters, an encoded communication of the communication; and
decode the encoded communication using a Bose-Chaudhuri-Hocquenghem (BCH) product code, a BCH component of the BCH product code comprising a grid in accordance with one or more code parameters for the BCH product code, a quantity of elements of the grid being in accordance with the one or more communication parameters.

11. The receiver of claim 10,
wherein the one or more code parameters include a quantity of columns of the grid, wherein the quantity of columns is in accordance with a quantity of channel bits of the communication, and wherein the quantity of channel bits indicate a quantity of bit available for data in accordance with the allocation size and the MCS.

12. The receiver of claim 10,
wherein the one or more code parameters include a correction capability for the BCH product code, and wherein the correction capability is related to a quantity of information bits included in the communication, the quantity of information bits being related to a quantity of channel bits of the communication and the MCS.

13. The receiver of claim 10,
wherein the grid includes one or more encoded rows and one or more encoded columns, and wherein, to cause the receiver to decode the encoded communication, the at least one processor is operable to cause the receiver to:
decode, using the BCH product code, the one or more encoded rows; and
decode, using the BCH product code, the one or more encoded columns if at least one of the one or more encoded rows is not successfully decoded.

14. The receiver of claim 10,
wherein the grid includes one or more encoded rows and one or more encoded columns, and wherein, to cause the receiver to decode the encoded communication, the at least one processor is operable to cause the receiver to:
iteratively decode the one or more encoded rows followed by decoding the one or more encoded columns.

15. The receiver of claim 10, wherein, to cause the receiver to decode the encoded communication, the at least one processor is operable to cause the receiver to:
flip a log likelihood ratio (LLR) value for one or more entries of a code block of the encoded communication; and
decode, using the BCH product code, the code block after flipping the LLR value for the one or more entries.

16. A method of wireless communication performed by a transmitter, comprising:
transmitting or receiving, to or from a receiver, an indication of one or more communication parameters associated with a communication, the one or more communication parameters including at least one of an allocation size or a modulation and coding scheme (MCS);
encoding the communication using a Bose-Chaudhuri-Hocquenghem (BCH) product code, a BCH component of the BCH product code comprising a grid in accordance with one or more code parameters for the BCH product code, a quantity of elements of the grid being in accordance with the one or more communication parameters; and
transmitting, to the receiver and using the one or more communication parameters, the encoded communication.

17. The method of claim 16,
wherein the one or more code parameters include a quantity of columns of the grid, wherein the quantity of columns is in accordance with a quantity of channel bits of the communication, and wherein the quantity of channel bits indicate a quantity of bit available for data in accordance with the allocation size and the MCS.

18. The method of claim 17,
wherein the one or more code parameters include a quantity of rows of the grid, and wherein the quantity of rows is in accordance with the quantity of channel bits and the quantity of columns.

19. The method of claim 18, further comprising:
mapping information bits and parity bits related to the communication to the grid, the grid having a size defined by the quantity of columns and the quantity of rows; and
encoding columns of the grid and rows of the grid using the BCH product code to generate the encoded communication.

20. The method of claim 16,
wherein the one or more code parameters include a correction capability for the BCH product code, and wherein the correction capability is related to a quantity of information bits included in the communication, the quantity of information bits being related to a quantity of channel bits of the communication and the MCS.

21. The method of claim 20,
wherein the correction capability is defined in accordance with a quantity of available information bits in the grid being greater than or equal to the quantity of information bits included in the communication.

22. The method of claim 21,
wherein the correction capability is a first communication capability, wherein one or more rows of the grid are related to a second correction capability, and wherein a quantity of the one or more rows is defined in accordance with a difference between the quantity of available information bits and the quantity of information bits included in the communication.

23. The method of claim 16,
wherein the indication of the one or more communication parameters is communicated in downlink control information that schedules the communication.

24. The method of claim 16,
wherein the communication comprises a transport block, the method further comprising:
mapping information bits of the transport block to the grid;
encoding rows of the grid using the BCH product code to generate a first one or more codewords of the encoded communication; and
encoding columns of the grid using the BCH product code to generate a second one or more codewords of the encoded communication.

25. A method of wireless communication performed by a receiver, comprising:
transmitting or receiving, to or from a transmitter, an indication of one or more communication parameters related to reception of a communication, the one or more communication parameters including at least one of an allocation size or a modulation and coding scheme (MCS); receiving, from the transmitter and using the one or more communication parameters, an encoded communication, of the communication; and
decoding the encoded communication using a Bose-Chaudhuri-Hocquenghem (BCH) product code, a BCH component of the BCH product code comprising a grid in accordance with one or more code parameters for the BCH product code, a quantity of elements of the grid being in accordance with the one or more communication parameters.

26. The method of claim 25,
wherein the one or more code parameters include a quantity of columns of the grid, wherein the quantity of columns is in accordance with a quantity of channel bits of the communication, and wherein the quantity of channel bits indicate a quantity of bit available for data in accordance with the allocation size and the MCS.

27. The method of claim 25,
wherein the one or more code parameters include a correction capability for the BCH product code, and wherein the correction capability is related to a quantity of information bits included in the communication, the quantity of information bits being related to a quantity of channel bits of the communication and the MCS.

28. The method of claim 25,
wherein the grid includes one or more encoded rows and one or more encoded columns, and wherein decoding the encoded communication comprises:
decoding, using the BCH product code, the one or more encoded rows; and
decoding, using the BCH product code, the one or more encoded columns if at least one of the one or more encoded rows is not successfully decoded.

29. The method of claim 25,
wherein the grid includes one or more encoded rows and one or more encoded columns, and wherein decoding the encoded communication comprises:
iteratively decoding the one or more encoded rows followed by decoding the one or more encoded columns.

30. The method of claim 25,
wherein decoding the encoded communication comprises:
flipping a log likelihood ratio (LLR) value for one or more entries of a code block of the encoded communication; and
decoding, using the BCH product code, the code block after flipping the LLR value for the one or more entries.

* * * * *